(12) United States Patent
Williams et al.

(10) Patent No.: US 12,137,160 B2
(45) Date of Patent: Nov. 5, 2024

(54) METHOD OF MANAGEMENT OF REMOTE OPERATIONS

(71) Applicant: Arqit Limited, London (GB)

(72) Inventors: David Williams, Sussex (GB); Barry Childe, Essex (GB); David Bestwick, Essex (GB); Andrew James Victor Yeomans, Hertfordshire (GB); Omar Iqbal, Hampshire (GB)

(73) Assignee: Arqit Limited, London (GB)

( * ) Notice: Subject to any disclaimer, the term of this patent is extended or adjusted under 35 U.S.C. 154(b) by 291 days.

(21) Appl. No.: 17/775,214

(22) PCT Filed: Nov. 6, 2020

(86) PCT No.: PCT/GB2020/052825
§ 371 (c)(1),
(2) Date: May 6, 2022

(87) PCT Pub. No.: WO2021/090024
PCT Pub. Date: May 14, 2021

(65) Prior Publication Data
US 2022/0393866 A1 Dec. 8, 2022

(30) Foreign Application Priority Data
Nov. 8, 2019 (GB) .................... 1916309

(51) Int. Cl.
H04L 9/08 (2006.01)
H04B 7/185 (2006.01)
H04B 10/70 (2013.01)

(52) U.S. Cl.
CPC ....... H04L 9/0855 (2013.01); H04B 7/18508 (2013.01); H04B 10/70 (2013.01)

(58) Field of Classification Search
CPC . H04L 9/0855; H04L 9/0852; H04B 7/18508; H04B 10/70; H04B 7/18513; H04B 10/118; H04B 7/1851
See application file for complete search history.

(56) References Cited

U.S. PATENT DOCUMENTS

2004/0184603 A1   9/2004  Pearson et al.
2014/0294399 A1*  10/2014  Makowski ........... H04B 10/118
                                                        398/126

(Continued)

FOREIGN PATENT DOCUMENTS

WO    2019115984    6/2019

OTHER PUBLICATIONS

Hughes et al., "Quantum computing: The Final frontier?", IEEE Intelligent Systems, Sep. 2000, pp. 10-18 (Year: 2000).*

(Continued)

*Primary Examiner* — Henry Tsang
(74) *Attorney, Agent, or Firm* — Dentons US LLP

(57) ABSTRACT

A method of scheduling encryption key delivery communication sessions in a satellite quantum key distribution system comprising a constellation of one or more satellites and a plurality of user ground stations comprises producing a list of user ground stations requiring encryption keys. For each satellite of the constellation of satellites, determining a region of the earths surface within which the satellite can carry out encryption key delivery communication sessions to user ground stations using a quantum optical communications link during a scheduling period. Obtaining a cloud cover map. Comparing the locations of the listed user ground stations, the determined regions of the earths surface for the constellation of satellites, and the cloud cover map, to identify listed user ground stations to which encryption key delivery can be carried out by the constellation of satellites during the scheduling period. Determining which (Continued)

of the identified user ground stations each satellite of the constellation of satellites will carry out encryption key delivery communication sessions with at different times in the scheduling period based upon one or more of: an amount of unused encryption keys at each identified user ground station; and an expected time duration before each identified user ground station runs out of encryption keys.

19 Claims, 9 Drawing Sheets

(56) References Cited

U.S. PATENT DOCUMENTS

| | | | |
|---|---|---|---|
| 2017/0192095 A1* | 7/2017 | Jobanputra | H04B 7/18517 |
| 2020/0059358 A1* | 2/2020 | Legré | G06N 10/00 |

OTHER PUBLICATIONS

Examination Report of Canadian Patent Application No. 3,157,135, dated Aug. 31, 2023.

Hughes, et al., Quantum computing: the final frontier, IEEE Intelligent Systems, IEEE Service Center, New York, NY, US, vol. 15, No. 5, Sep. 1, 2000, pp. 10-18.

* cited by examiner

METHOD OF MANAGEMENT OF REMOTE OPERATIONS

This application is the National Stage filing under 35 U.S.C. 371 of International Application No. PCT/GB2020/052825, filed Nov. 6, 2020, claims the benefit of GB Application No. 1916309.6, filed Nov. 8, 2019, the contents of which are all hereby incorporated by reference herein in their entirety.

The present application relates to a method of scheduling encryption key delivery communication sessions in a satellite quantum key distribution system, and a system and software for carrying out the method.

BACKGROUND

Cryptography is used to protect billions of transactions every day from, without limitation, for example Transport Layer Security (TLS) security for online shopping and banking to ultra-secure government communications. These transactions rely on reliable and secure means for at least two or more transacting parties to share a secret key, enabling encryption of data by one party and subsequent decryption by the other party(ies). When commercially usable universal quantum computers become available, a variety of these types of transactions, tasks and applications including, without limitation, for example digital banking, web certification, Know Your own Client (KYC), digital asset transfer, and authentication will be vulnerable. These transactions, tasks and applications are currently provided using software systems that typically use conventional cryptography and/or encryption techniques and protocols that are not sufficiently resilient enough to withstand an attack from such quantum computers (QCs).

QCs can potentially crack many classical cryptography codes almost effortlessly. There has also been a ground swell in interest in quantum computing within the last year as a result of the success of D-Wave in selling commercial systems. Furthermore, a number of breakthroughs by technology companies such as, without limitation, for example Microsoft(®), Intel(®), Google(®) and others in QC techniques promise to make a universal QC viable in the near future (e.g. five to ten years time). QCs have already become a threat to current cryptography and/or encryption techniques.

For example, current methods to exchange cryptographic keys between two parties will be vulnerable to QC attack. If the cryptographic primitives involved in the key-exchange protocol can be broken, the exchanged key is compromised and the encrypted data is revealed to the attacker. Classical key-exchange protocols are based on the hardness of discrete logarithm problem (e.g. Diffie-Hellman (DH)) or the elliptic curve discrete logarithm problem (e.g. Elliptic-Curve DH (ECDH)). Neither of these problems is guaranteed to be hard and both problems can be broken by a QC in polynomial time. This is of particular concern to both large and small organisations, corporations and also to individual users of public and private networks (e.g. Internet or corporate Intranets). If one is unable to reliably perform key exchange, then all current transactions, tasks and applications are vulnerable to attack by a QC.

The field of "Quantum Cryptography" aims to address these risks by developing both quantum secure cryptographic algorithms (so-called quantum-safe algorithms) and Quantum Key Distribution (QKD) techniques. Whilst the combination of both provides the ultimate solution, QKD as a stand-alone technique still has much to offer and is not in itself reliant on the development of quantum-safe algorithms to become widely adopted. However, even reliably performing QKD at scale for a wide range of users from small to large corporations and/or individuals is still a costly and time consuming exercise.

There is a desire for a robust, secure and cost effective approach for carrying out QKD, and one approach which has been proposed is to carry out QKD between one or more satellites and users on the ground.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

In a first aspect, the present disclosure provides a method of scheduling encryption key delivery communication sessions in a satellite quantum key distribution system comprising a constellation of one or more satellites and a plurality of user ground stations, the method comprising: producing a list of user ground stations requiring encryption keys; for each satellite of the constellation of satellites, determining a region of the earths surface within which the satellite can carry out encryption key delivery communication sessions to user ground stations using a quantum optical communications link during a scheduling period; obtaining a cloud cover map; comparing the locations of the listed user ground stations, the determined regions of the earths surface for the constellation of satellites, and the cloud cover map, to identify listed user ground stations to which encryption key delivery can be carried out by the constellation of satellites during the scheduling period; and determining which of the identified user ground stations each satellite of the constellation of satellites will carry out encryption key delivery communication sessions with at different times in the scheduling period based upon one or more of: an amount of unused encryption keys at each identified user ground station; and an expected time duration before each identified user ground station runs out of encryption keys.

In a second aspect, the present disclosure provides a method of scheduling encryption key delivery communication sessions in a satellite quantum key distribution system comprising a constellation of one or more satellites and a plurality of user ground stations, the method comprising; obtaining, for one satellite of the constellation of one or more satellites, information regarding an orbital path of the satellite and information regarding identities and locations of the plurality of user ground stations, and using the obtained information to determine the identities and locations of visible user ground stations of the plurality of user ground stations which will be able to be carry out a communication session with the satellite during a duration of the schedule; determining a time when each visible user ground station will be able to carry out the communication session with the satellite, obtaining meteorological information relating to a location of each of the visible user ground stations, and determining, based on the obtained meteorological information, which of the visible user ground stations are user ground stations which will be sufficiently cloud free to carry out a communication session with the satellite at the respective determined time; for each of the sufficiently cloud free user ground stations, obtaining information regarding the volume of encryption keys at the user ground station, and calculating a priority for encryption key delivery to the user ground station based, at least in part, on the volume of encryption keys at the user ground station; using the calculated priorities for encryption key delivery to the user ground stations and the determined times when each user ground station will be able to carry out a communication session with the satellite, generating a list of timings and priorities of target user ground stations for distribution of encryption keys from the satellite during the duration of the schedule; and using the generated list to produce a key distribution schedule which identifies the timing of the communication sessions to be carried out between the satellite and the different user ground stations, In a third aspect, the present disclosure provides an apparatus arranged to schedule encryption key delivery communication sessions in a satellite quantum key distribution system comprising a constellation of one or more satellites and a plurality of user ground stations, the apparatus comprising: a priority list generation module arranged to produce a list of user ground stations requiring encryption keys; a contact predictor module arranged to, for each satellite of the constellation of satellites: determine a region of the earths surface within which the satellite can carry out encryption key delivery communication sessions to user ground stations using a quantum optical communications link during a scheduling period; obtain a cloud cover map; compare the locations of the listed user ground stations, the determined regions of the earths surface for the constellation of satellites, and the cloud cover map, to identify listed user ground stations to which encryption key delivery can be carried out by the constellation of satellites during the scheduling period; and determine which of the identified user ground stations each satellite of the constellation of satellites will carry out encryption key delivery communication sessions with at different times in the scheduling period based upon one or more of: an amount of unused encryption keys at each identified user ground station; and an expected time duration before each identified user ground station runs out of encryption keys.

In a fourth aspect, the present disclosure provides apparatus arranged to schedule encryption key delivery communication sessions in a satellite quantum key distribution system comprising a constellation of one or more satellites and a plurality of user ground stations, the apparatus comprising: means arranged to obtain, for one satellite of the constellation of one or more satellites, information regarding an orbital path of the satellite and information regarding identities and locations of the plurality of user ground stations, and to use the obtained information to determine the identities and locations of visible user ground stations of the plurality of user ground stations which will be able to be carry out a communication session with the satellite during a duration of the schedule; means arranged to determine a time when each visible user ground station will be able to carry out the communication session with the satellite, obtain meteorological information relating to a location of each of the visible user ground stations, and determine, based on the obtained meteorological information, which of the visible user ground stations are user ground stations which will be sufficiently cloud free to carry out a communication session with the satellite at the respective determined time; means arranged to, for each of the sufficiently cloud free user ground stations, obtain information regarding the volume of encryption keys at the user ground station, and calculate a priority for encryption key delivery to the user ground station based, at least in part, on the volume of encryption keys at the user ground station; means arranged to use the calculated priorities for encryption key delivery to the user ground stations and the determined times when each user ground station will be able to carry out a communication session with the satellite, to generate a list of timings and priorities of target user ground stations for distribution of encryption keys from the satellite during the duration of the schedule; and means arranged to use the generated list to produce a key distribution schedule which identifies the timing of the communication sessions to be carried out between the satellite and the different user ground stations.

In a fifth aspect, the present disclosure provides an apparatus comprising a processor unit, a memory unit and a communication interface, the processor unit connected to the memory unit and the communication unit, wherein the apparatus is configured to implement the computer-implemented method according to the first aspect.

In a sixth aspect, the present disclosure provides an apparatus comprising a processor unit, a memory unit and a communication interface, the processor unit connected to the memory unit and the communication unit, wherein the apparatus is configured to implement the computer-implemented method according to the second aspect.

In a seventh aspect, the present disclosure provides a computer-readable medium comprising code or computer instructions stored thereon, which when executed by a processor unit, causes the processor unit to perform the computer-implemented method according to the first aspect.

In an eighth aspect, the present disclosure provides a computer-readable medium comprising code or computer instructions stored thereon, which when executed by a processor unit, causes the processor unit to perform the computer-implemented method according to the second aspect.

In a ninth aspect, the present disclosure provides a method of scheduling encryption key delivery communication sessions in a satellite quantum key distribution system comprising a constellation of one or more satellites and a plurality of user ground stations, the method comprising: for each satellite of the constellation of satellites, identifying user ground stations requiring encryption keys with which the satellite can carry out encryption key delivery communication sessions using a quantum optical communications link during a scheduling period; obtaining cloud cover information; comparing the locations of the identified user ground stations, and the cloud cover information, to identify user ground stations to which encryption key delivery can be carried out by the satellite during the scheduling period; and determining which of the identified user ground stations to which encryption key delivery can be carried out the satellite will carry out encryption key delivery communication sessions with at different times in the scheduling period based upon one or more of: an amount of unused encryption keys at each identified user ground station; and an expected time duration before each identified user ground station runs out of encryption keys.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
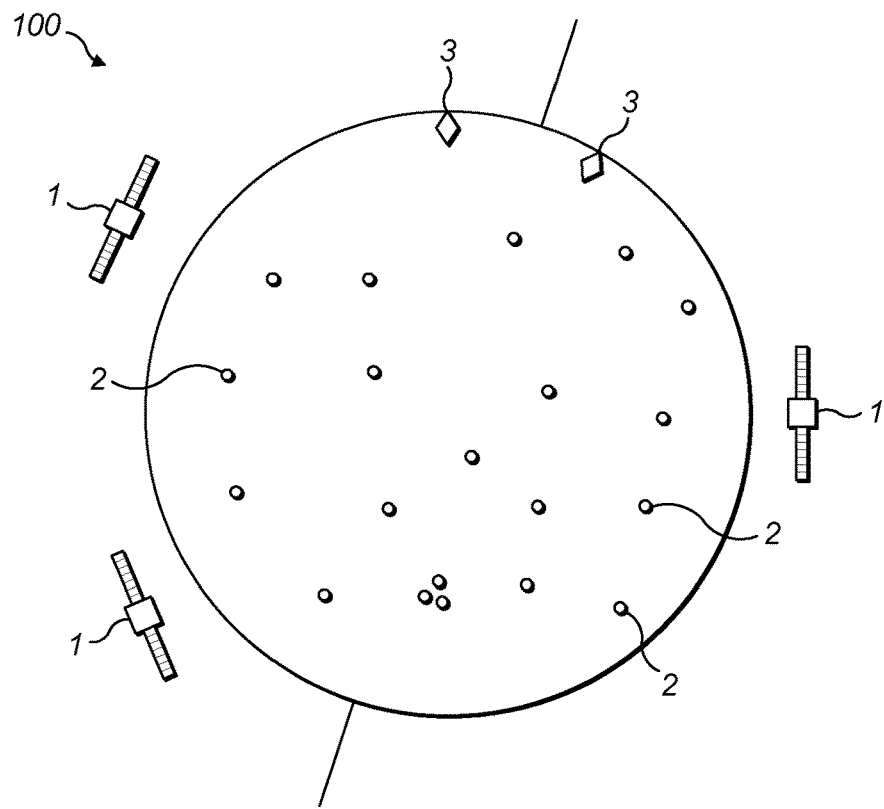
FIG. 1 is a schematic diagram illustrating a satellite quantum key distribution system according to a first embodiment of the invention.

Common reference numerals are used throughout the figures to indicate similar features.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 is a schematic diagram illustrating an overview of an example of a satellite quantum key distribution system 100 according to a first embodiment of the invention. The satellite quantum key distribution system 100 comprises a constellation of satellites 1 in earth orbit, a number of user ground stations 2, and at least one ground control station 3. In the illustrated example the satellites 1 are in low earth orbit (LEO) inclined polar orbits. However, in other examples constellation may comprise satellites in other orbits, for example geostationary orbit (GEO), or mid earth orbit (MEO). In operation of the satellite quantum key distribution system 100 the satellites 1 use quantum key distribution (QKD) techniques to distribute encryption keys to the user ground stations 2. Each user ground station 2 then stores the encryption keys it has received in a key buffer associated with the user ground station 2 for subsequent use in cryptographic services. Examples of cryptographic services include encryption, and other security related services such as confidentiality, integrity, authentication, source identification, authorization, and non-repudiation. This list is not intended to be exhaustive. The key storage buffers are data stores. Preferably, the key buffers are data stores incorporated is hardware storage modules (HSM). The HSM will ensure that any attempts to extract keys are blocked or detected. The HSM provides tamper-detection sensors, such as wire cages surrounding encapsulated memory modules, detection of over- or under-voltages and temperatures, etc. It will also provide restricted and authenticated communications interfaces to the cryptographic systems of end users. An example of an encryption based service is encrypted communications, where the encryption keys may be used to encrypt transmissions over a conventional communication channel (e.g. a phone line, an internet connection, a radio frequency transmission, a fibre optic network, a private or proprietary secure network, such as a network using the Arquit secure communications methodology, etc.) between the first user ground station 2a and the second user ground station 2b. The constellation of satellites 1 may comprise one satellite, or may comprise multiple, i.e., two or more, satellites.

In the illustrated embodiment the at least one ground control station 3 comprises two ground control stations 3a and 3b. In other examples there may be a different number of ground control stations 3.

The, or each, satellite 1 has a number of optical transmitters and each user ground station 2 has an optical receiver, which enable quantum optical communications links to be established from the satellites 1 to the user ground stations 2. The, or each, satellite 1 also comprises an optical receiver and each user ground station 2 has an optical transmitter, which enable classical (that is, non-quantum) optical communications links to be established from the user ground stations 2 to the satellites 1.

An overview of the operation of the satellite quantum key distribution system 100 is that a respective schedule is transmitted to each of the satellites 1, and to selected ground user stations 2, by the ground control station 3 and stored on-board the satellite 1 for subsequent execution. The satellites 1 then proceed to contact the user ground stations 2 to distribute the encryption keys as they travel in their orbits, according to their respective schedules.

Figure 2:
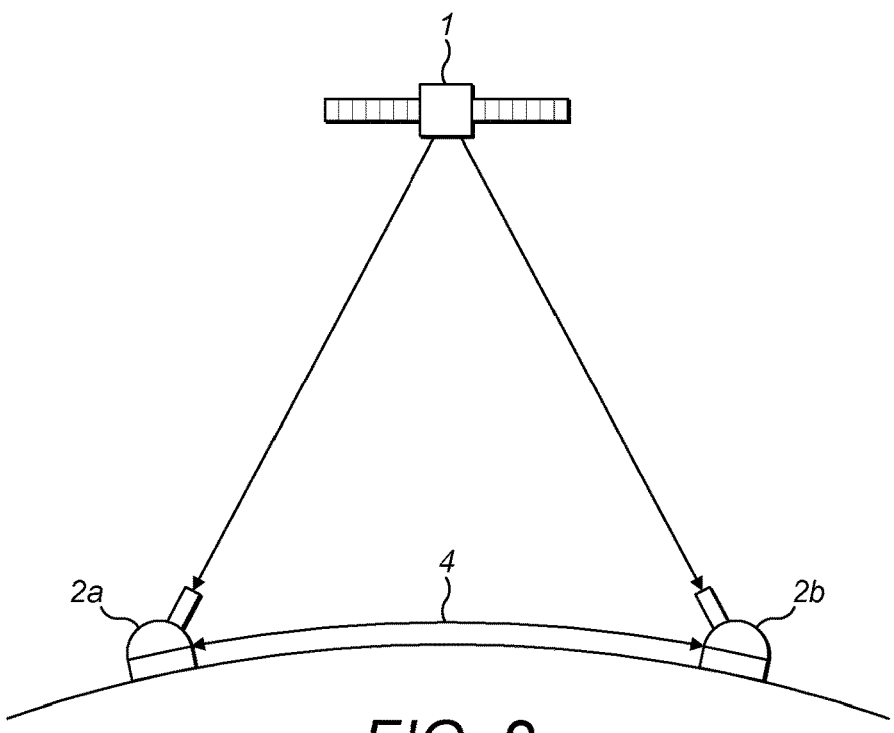
FIG. 2 is a schematic diagram illustrating a first quantum key distribution methodology which can be used by the system of FIG. 1.

An example of a first QKD methodology which may be used in operation of the satellite quantum key distribution system 100 is shown in FIG. 2. In the example of FIG. 2 the satellite 1 is arranged to carry out quantum key distribution of an encryption key to a first user ground station 2a and an associated second user ground station 2b simultaneously. In the methodology shown in FIG. 2, a pair of photons are generated on the satellite 1 which share entangled quantum properties, such as polarisation. The photons being part of entangled pairs are transmitted to the user ground stations, with one photon from each pair being transmitted in a beam to the first user ground station 2a and the other photon from each pair being transmitted in a beam to the second user ground station 2b. Once received, the first and second user ground stations 2a and 2b detect the quantum information and use this, through a key agreement process, to determine the key, which the first and second user ground stations 2a and 2b then store in respective key buffers. The stored encryption key can then be used by the first and second user ground stations 2a and 2b to support cryptographic services. The key agreement process used by the first and second user ground stations 2a and 2b may include the use of key sifting carried out between the first and second user ground stations 2a and 2b over a conventional communications channel 4 to agree what key data to use. Accordingly, the associated first and second user ground stations 2a and 2b are provided with common encryption keys to support cryptographic services between, or involving, the associated first and second user ground stations 2a and 2b. One example of a suitable protocol which may be used between the satellite 1 and the first and second user ground stations 2a and 2b in the first QKD methodology is the E91 protocol. The communication channel 4 may, for example, be an optical or radio communications channel, a telecommunications network, or the Internet.

It will be understood that in order to use the first QKD methodology it is necessary for the satellite to have an optical link with both of the first and second user ground stations 2a and 2b simultaneously. This imposes geographical constraints on the locations of the first and second user ground stations 2a and 2b, for example, if the satellite 1 were in an orbit at around 700 km altitude the locations of the first and second user ground stations 2a and 2b on the earths surface could be separated by up to approximately 2000 km.

Figure 3:
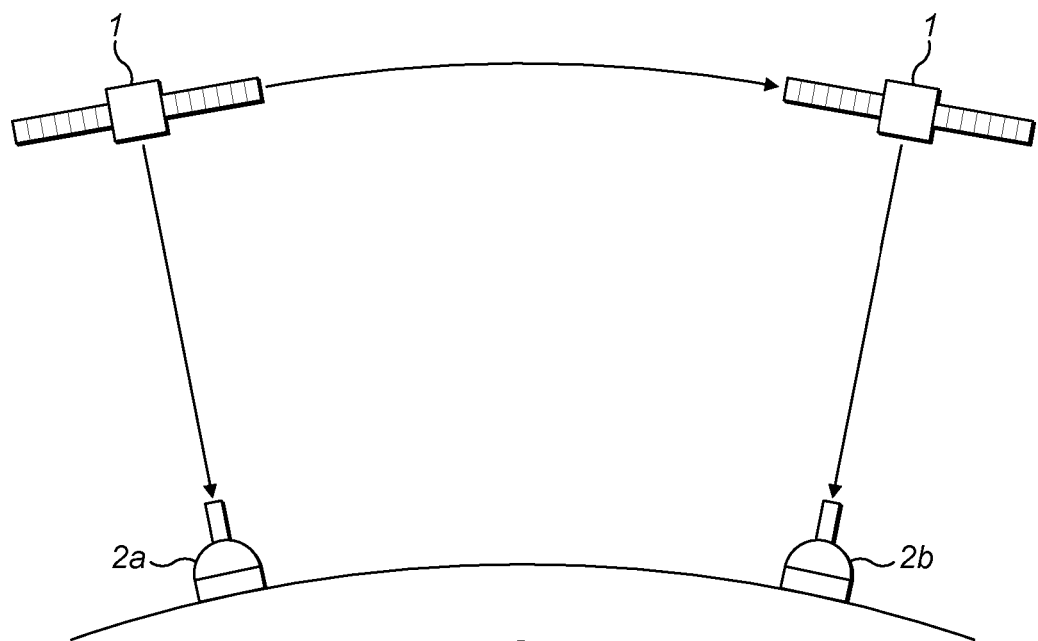
FIG. 3 is a schematic diagram illustrating a second quantum key distribution methodology which can be used by the system of FIG. 1.

An example of a second QKD methodology which may be used in operation of the satellite quantum key distribution system 100 is shown in FIG. 3. In the example of FIG. 3 the satellite 1 is arranged to carry out quantum key distribution of an encryption key to a first user ground station 2a and a second user ground station 2b at different times. In the methodology shown in FIG. 3, a first string of random numbers is generated on the satellite 1 and used to encode data onto a stream of photons emitted by a single photon source on the satellite 1 that is directed in a laser beam to the first user ground station 2a to form a quantum optical communications link from the satellite 1 to the first user ground station 2a. The satellite 1 and the first ground station 2a then perform processing and exchange information using a classical communication channel to agree the first received key extracted from the photon stream. The first ground user station 2a then stores the received first key in a key buffer of the first user ground station 2a. The first encryption key is also stored in a key data store of the satellite. Subsequently, a second stream of random numbers is generated on the satellite 1 and used to encode data onto photons emitted by a single photon source on the satellite 1 that is directed in a laser beam to a second user ground station 2b to form a quantum optical communications link from the satellite 1 to the second user ground station 2b. The satellite and the second ground station 2b then perform processing and exchange information using a classical communication channel to agree the second received encryption key extracted from the photon stream. An XOR of the first and second encryption keys is then sent from the satellite 1 to the second user ground station 2b using a classical (non-quantum) communications channel. The first encryption key is deleted after the XOR has been generated. The second ground user station 2b is able to use the received second encryption key and XOR data to derive the first encryption key, and then stores the derived first encryption key in a key buffer of the second user ground station 2b. The first and second user ground stations 2a and 2b can then use the first encryption key stored in their respective key buffers to support cryptographic services. Accordingly, the associated first and second user ground stations 2a and 2b are provided with common encryption keys to support cryptographic services between, or involving, the associated first and second user ground stations 2a and 2b. One example of a suitable protocol which may be used to deliver the encryption keys from the satellite 1 to each of the first and second user ground stations 2a and 2b in the second QKD methodology is the BB84 Decoy State protocol. In other examples different Prepare and Measure protocols, including for example other Decoy State protocols, may be used instead of the BB84 Decoy State protocol. Examples of a suitable single photon source which may be used by the satellite 1 in the second QKD methodology are a Weak Coherent Source or Faint Pulse Source.

In some examples of the second QKD methodology the satellite 1 may store a copy of the XOR and subsequently provide this to the first user ground station 2a using a classical (non-quantum) communications channel. The first ground user station 2b is then able to use the previously received first encryption key and XOR data to derive the second encryption key, and then stores the derived second encryption key in a key buffer of the first user ground station 2q. The first and second user ground stations 2a and 2b can then also use the second encryption key stored in their respective key buffers to support cryptographic services It will be understood that the second QKD methodology may be used for first and second user ground stations 2a and 2b at any location because the satellite can communicate with the first and second user ground stations 2a and 2b at different times.

The above example of the second QKD methodology is described in terms of the delivery of a first encryption key to two user ground stations 2a and 2b, for clarity. In operation of the satellite quantum key distribution system 100 the satellite 1 can deliver an encryption key to a number, and possibly a large number, of different ground stations 2 in different communication sessions for storage in their respective key buffers. This may, for example, be desired to enable cryptographic services, such as encrypted communications, between multiple associated user ground stations 2 at different locations or sites requiring group cryptographic services based on a common shared key.

This group delivery may be carried out by retaining the first encryption key, rather than deleting it, after the XOR has been generated Subsequently, a further encryption key generated on the satellite 1 is used to encode data into light emitted by a single photon source on the satellite 1 that is directed in a laser beam to a further user ground station 2 to form a quantum optical communications link from the satellite 1 to the further user ground station 2, and an XOR of the first and further encryption keys is sent from the satellite 1 to the further user ground station 2 using a classical (non-quantum) communications channel. The further ground user station 2 is able to use the received further encryption key and XOR data to derive the first encryption key, and then stores the derived first encryption key in a key buffer of the second user ground station 2. The first, second and further user ground stations can then use the first encryption key stored in their respective key buffers to support cryptographic services. This process may be repeated for as many further user ground stations 2 as desired. The first encryption key is deleted after the XOR has been generated for the final further user ground station. Accordingly, the multiple associated user ground stations 2 are provided with common encryption keys to support cryptographic services between, or involving, the multiple associated user ground stations 2.

Figure 4:
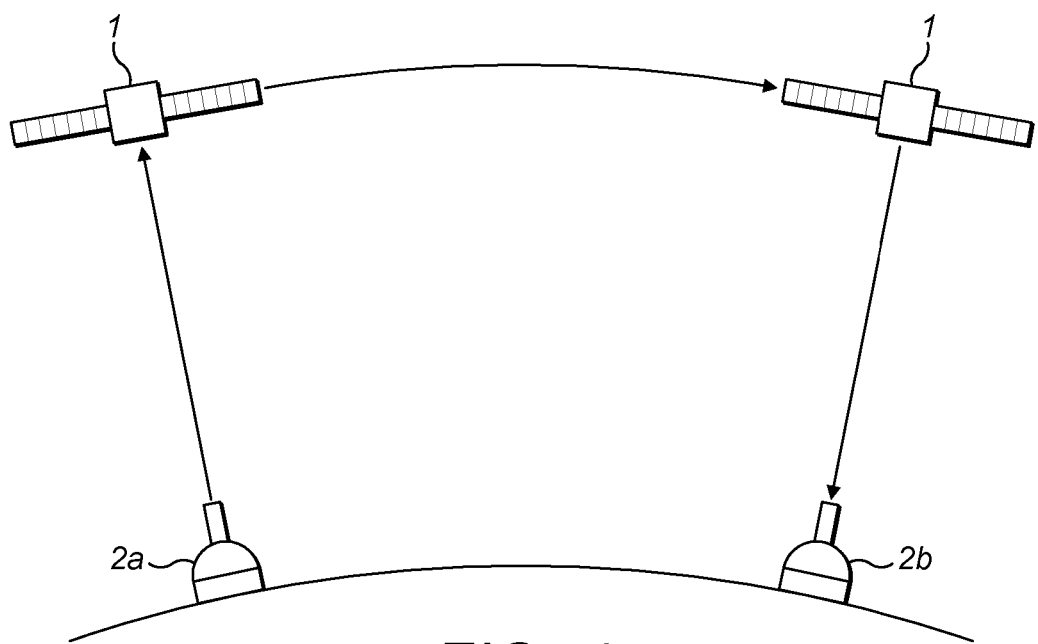
FIG. 4 is a is a schematic diagram illustrating a third quantum key distribution methodology which can be used by the system of FIG. 1.

An example of a third QKD methodology which may be used in operation of the satellite quantum key distribution system 100 is shown in FIG. 4. In the example of FIG. 4 the satellite 1 is arranged to carry out quantum key distribution of a user encryption key from a first user ground station 2a to a second user ground station 2b. In the methodology shown in FIG. 4, a first stream of random numbers generated on the satellite 1 is used to encode data into light emitted by a single photon source on the satellite 1 that is directed in a laser beam to the first user ground station 2a to form a quantum optical communications link from the satellite 1 to the first user ground station 2a. The satellite and the first ground station 2a then perform processing and exchange information using a classical communication channel to agree the first received encryption key extracted from the photon stream. The first user ground station 2a then produces an XOR of the received first encryption key and a user encryption key. The user encryption key may, for example, be an encryption key generated internally at the first user ground station 2a. The XOR is then transmitted to the satellite 1 by the first user ground station 2a using a classical communications link from the first user ground station 2a to the satellite 1. The satellite 1 is then able to use the first encryption key and the XOR data to derive the user encryption key. The derived user encryption key is then stored in a key data store of the satellite. Subsequently, a second stream of random numbers generated on the satellite 1 is used to encode data into light emitted by a single photon source on the satellite 1 that is directed in a laser beam to a second user ground station 2b to form a quantum optical communications link from the satellite 1 to the second user ground station 2b. The satellite and the second ground station 2b then perform processing and exchange information in a classical communication channel to agree the second received encryption key extracted from the photon stream. An XOR of the user encryption key and the second encryption key is then sent from the satellite 1 to the second user ground station 2b using a classical (non-quantum) communications channel. The user encryption key is deleted form the satellite after the XOR has been generated. The second ground user station 2b is able to use the received second encryption key and XOR data to derive the user encryption key, and then stores the derived user encryption key in a key buffer of the second user ground station 2b. The first and second user ground stations 2a and 2b can then use the user encryption key stored in their respective key buffers to support cryptographic services. Accordingly, the associated first and second user ground stations 2a and 2b are provided with common encryption keys to support cryptographic services between, or involving, the associated first and second user ground stations 2a and 2b. One example of a suitable protocol which may be used to deliver the encryption keys from the satellite 1 to each of the first and second user ground stations 2a and 2b in the second QKD methodology is the BB84 Decoy State protocol. In other examples different Prepare and Measure protocols, including for example other Decoy State protocols, may be used instead of the BB84 Decoy State protocol. Examples of a suitable single photon source which may be used by the satellite 1 in the second QKD methodology are a Weak Coherent Source or Faint Pulse Source.

The above example of the third QKD methodology is described in terms of the delivery of a user encryption key from a first user ground station 2a to a second user ground station 2b, for clarity. In operation of the satellite quantum key distribution system 100 the satellite 1 can deliver a user encryption key to a group comprising a number, and possibly a large number, of multiple different ground stations 2 in different communication sessions for storage in their respective key buffers. Accordingly, the multiple associated user ground stations 2 are provided with common encryption keys to support cryptographic services between, or involving, the multiple associated user ground stations 2. This may, for example, be desired to enable cryptographic services, such as encrypted communications, between multiple associated ground stations 2 at different locations or sites requiring group cryptographic services based on a common shared key, such as locations or sites of a single organization.

This group delivery may be carried out by retaining the user encryption key, rather than deleting it, after the XOR has been generated by the satellite. Subsequently, a further encryption key generated on the satellite 1 is used to encode data into light emitted by a single photon source on the satellite 1 that is directed in a laser beam to a further user ground station 2 to form a quantum optical communications link from the satellite 1 to the further user ground station 2, and an XOR of the user and further encryption keys is sent from the satellite 1 to the further user ground station 2 using a classical (non-quantum) communications channel. The further ground user station 2 is able to use the received further encryption key and XOR data to derive the user encryption key, and then stores the derived user encryption key in a key buffer of the second user ground station 2b. The first, second and further user ground stations can then use the user encryption key stored in their respective key buffers to support cryptographic services. This process may be repeated for as many further user ground stations 2 as desired. The user encryption key is deleted after the XOR has been generated for the final further user ground station. Accordingly, the associated first, second and further user ground stations 2 are provided with common encryption keys to support cryptographic services between, or involving, the associated first, second and further user ground stations 2.

In the examples described above of the second and third QKD methodologies use XOR operations to securely transfer encryption keys between the satellite 1 and ground user stations 2. In other examples the XOR operations may be replaced by an alternative encryption scheme. Preferably such an alternative encryption scheme is of the One-Time-Pad (OTP) type. Suitable alternative encryption schemes may include the use of modulo arithmetic. An example of a modulo arithmetic encryption scheme is of the type encrypting number A and B by (A,B)=(A+B) modulo C, and decrypting by (A,B)=(A−B) modulo C, where in some examples C=256. Another example of a modulo arithmetic encryption scheme is of the type where encrypt (A,B) =decrypt(A,B)=(−A−B) modulo C, which is a self-inverse, similarly to XOR. Other forms of modulo arithmetic encryption scheme may also be used.

In some examples the satellite quantum key distribution system 100 may additionally, or alternatively, use other QKD methodologies.

The above examples are described in terms of the delivery and use of a single encryption key, for clarity. Typically, in operation of the satellite quantum key distribution system 100 the satellite 1 will deliver a large number of encryption keys to one or both of the first and second user ground stations 2a and 2b in a single communication session for storage in their respective key buffers.

Commonly, each user ground station 2 will be associated with a single user or communication client of the quantum key distribution system 100. However, in some examples a single ground station 2 may be associated with, and provide encryption keys to, a number of users or communication clients.

As discussed above with reference to FIG. 1, the satellite quantum key distribution system 100 comprises a constellation of satellites 1 in LEO inclined polar orbits a number of user ground stations 2, and at least one ground control station 3. The at least one ground control station 3 generates schedules for the, or each, satellite 1 in the constellation of the satellite quantum key distribution system 100, each schedule setting out a series of instructions to be carried out by a respective satellite 1, and transmits a respective schedule to each satellite 1 for subsequent execution by that satellite 1. Each of the instructions to be carried out by a satellite 1 is to communicate with one or more of the user ground stations 2 and deliver encryption keys from the satellite 1 to those ground stations 2, or to receive a user encryption key from a user ground station 2. The at least one ground control station 3 also generates schedules for those of the user ground stations 2 of the satellite quantum key distribution system 100 with which the satellites 1 are to communicate, each schedule setting out a series of instructions to be carried out by a respective ground user station 2, and transmits a respective schedule to each ground user station 2 for subsequent execution by that ground user station 2. Each of the instructions to be carried out by a ground user station 2 is to communicate with a satellite 1. In order to generate the schedules the at least one ground control station 3 must take into account a number of static and dynamic parameters relating to the satellites 1, the user ground stations 2, and environmental conditions, as will be explained in more detail below.

In typical examples the LEO inclined polar orbits of the satellites 1 may be selected such that each satellite makes around 16 orbits per day, with an orbital period of around 90 minutes.

In the illustrated first embodiment the at least one ground control station 3 is located at a high latitude near one of the earths poles at a location or locations where the satellites 1 in LEO inclined polar orbits will pass within communications distance of the at least one ground control station 3 once on each orbit. This will be referred to as the satellites 1 passing over the at least one ground control station 3, for brevity, although it will be understood that the satellites 1 do not necessarily pass directly over the at least one ground control station 3. As each satellite 1 of the constellation passes over the at least one ground control station 3, the ground control station 3 opens a communications channel with the satellite 1. When the communication channel is open, the ground control station 3 uses the communications channel to send a respective schedule to the satellite 1, and the satellite 1 uses the communications channel to send a report on missions executed by the satellite 1 on its previous orbit. The communication channel, or additional communications channels, may also be used for other telemetry tracking and command (TT&C) communications required between the satellite 1 and the ground control station 3.

In some examples the at least one ground control station 3 may be located near to the North Pole.

Preferably, the communications channel(s) between the at least one ground control station 3 and the satellites 1 are encrypted communications channels. These encrypted communications channels may, for example, be radio channels or optical channels. In preferred examples the communications channel(s) may be protected by quantum encryption, as disclosed in WO2019/11594A1, the contents of which are incorporated herein by reference.

In the illustrated embodiment the at least one ground control station 3 comprises two ground control stations 3a and 3b. In some examples the at least one ground control station 3 may be a single ground control station 3. In other examples the at least one ground control station 3 may be three or more ground control stations 3. The use of two or more ground control stations 3 may be desirable in some implementations to provide redundancy and improve reliability, and to increase the range of geographical locations at which the multiple ground control stations 3 may be placed while collectively providing for each of the satellites 1 to pass over at least one of the multiple ground control stations 3 on each orbit.

Figure 5:
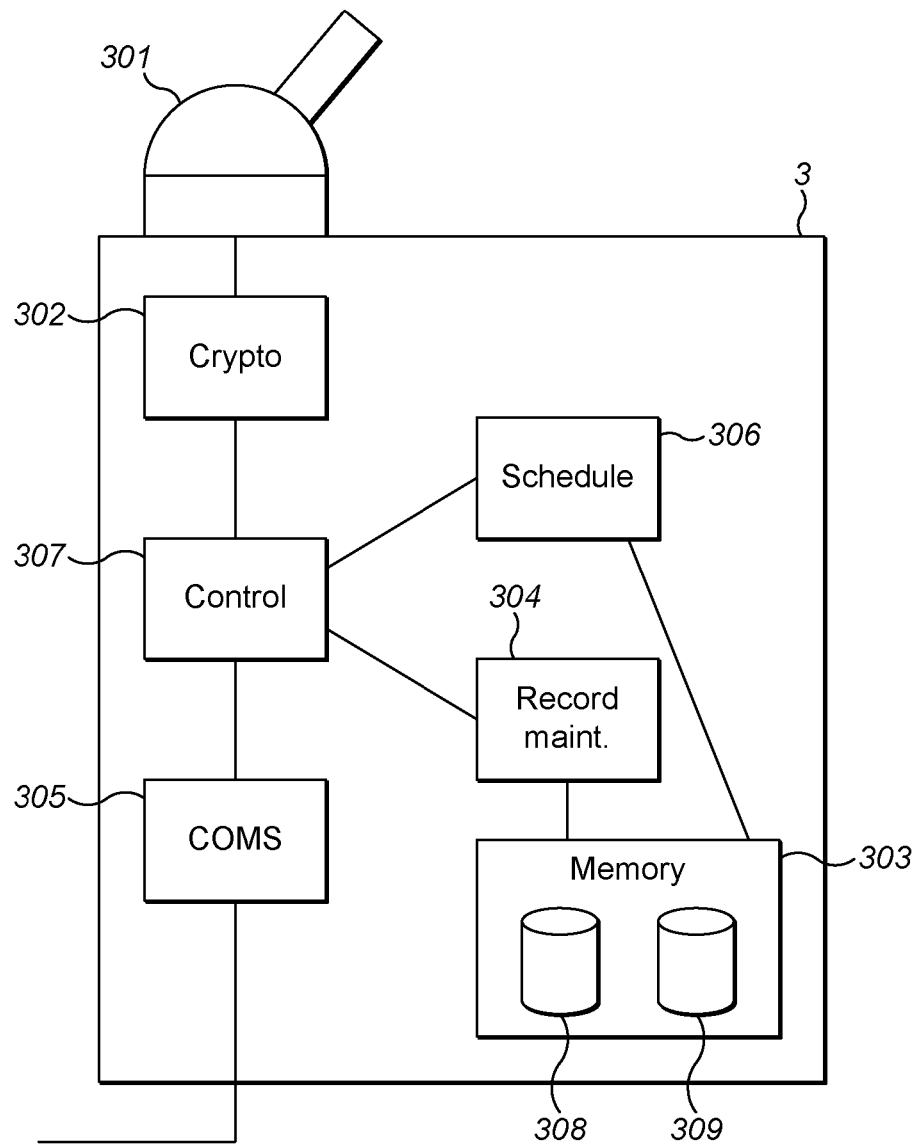
FIG. 5 is a schematic diagram of a ground control station useable in the system of FIG. 1.

FIG. 5 shows a schematic diagram of a ground control station 3 of the satellite quantum key distribution system 100.

As shown in FIG. 5, the at least one ground control station 3 comprises at least one communication terminal 301 able to form and maintain a bi-directional communications link with a satellite 1 of the constellation. The at least one ground control station 3 also comprises a cryptography module 302 arranged to carry out quantum safe encryption and decryption of communications to and from a satellite 1 through the communication terminal 1. The at least one ground control station 3 also comprises a mass memory 303, and a records maintenance module 304 arranged to update and maintain records stored in the mass memory 303. The at least one ground control station 3 also comprises a mass memory 303, and a records maintenance module 304 arranged to update and maintain records stored in the mass memory 303. The at least one communication terminal 301 may, for example, be able to form a radio or optical communications link with a satellite 1.

The at least one ground control station 3 also comprises a communications module 305 arranged to enable bidirectional communications with the user ground stations 2 of the system 100. The communications module 305 may carry out such communications through public telecommunications networks, such as the Internet. The communications between the at least one ground control station 3 and the user ground stations 2 are themselves authenticated with quantum keys and preferably encrypted, for security.

The at least one ground control station 3 also comprises a scheduling module 306 arranged to generate the schedules for the, or each, satellite 1. The operation of the scheduling module 306 will be explained in more detail below.

The at least one ground station 3 also comprises a control module 307 to control and coordinate the operation of the other parts of the at least one ground control station 3.

In the illustrated example of FIG. 5, the ground control station 3 comprises a number of components. In examples where there are multiple ground control stations 3 each of these ground control stations 3 may comprise all of these components, to provide redundancy. In other examples where there are multiple ground control stations 3 the required functionality of the ground stations 3 may be provided in a distributed manner by the different ground control stations 3, and some of the ground control stations 3 may not have all of the components.

In operation of the satellite quantum key distribution system 100, the records maintenance module 304 of the at least one ground control station 3 maintains a record for each user ground station 2 which is part of the system 100. These records of the user ground stations 2 are stored in the mass memory 303 of the at least one ground control station 3. Conveniently, the records of the user ground stations 2 are stored in the mass memory 303 as a user ground stations records database 308. The record for each user ground station 2 includes at least; the location of the user ground station 2, the current status of the user ground station 2. The record for each user ground station 2 will also indicate which other user ground stations 2 are associated with that user ground station 2, and so require delivery of the same (matching) encryption keys of that user ground station 2 in order to enable cryptographic services, such as encrypted communications, between the associated ground user stations 2.

In examples where the system 100 is able to carry out QKD using multiple different methodologies the record for each ground user station 2 may also indicate which of the available methodologies can be used by the ground user station 2. Such multiple different methodologies may comprise one or more of the first to third QKD methodologies discussed above, and/or other methodologies.

The record for each user ground station may also include the total size of the encryption key buffer of the user ground station 2. The different user ground stations 2 may have associated key buffers of different sizes. The sizes of the key buffers of the different user ground stations 2 may be set based on the rate at which each user ground station 2 is expected to use encryption keys, such a number of encryption keys used per month, with user ground stations 2 expected to use encryption keys at a higher rate having a larger key buffer. The size of the key buffer of a user ground station 2 may also be set based on the expected degree of difficulty in delivering encryption keys from a satellite 1 to that user ground station 2, with user ground stations 2 having a higher expected degree of difficulty having a larger key buffer. The expected degree of difficulty in delivering encryption keys from a satellite 1 to a specific user ground station 2 may be assessed based on the geographic location of the user ground station 2. The expected degree of difficulty in delivering encryption keys from a satellite 1 to a specific user ground station 2 may also be assessed based on the density of user ground stations 2 in proximity to the target ground station 2. The expected degree of difficulty in delivering encryption keys from a satellite 1 to a specific user ground station 2 may also be assessed based on weather records which indicate the probability of weather conditions allowing encryption key delivery from a satellite at that location. The expected degree of difficulty in delivering encryption keys may also be assessed based on expected light pollution levels at that location, which may interfere with the delivery of encryption keys, and may also be assessed based on the quality of the optical receiver of the user ground station 2. Some user ground stations 2 may select the size of their key buffer, for example a user ground station 2 may elect to have a larger key buffer to increase confidence that they will always have encryption keys available.

The record for each user ground station may also include other information, for example service levels agreed with the user ground station 2, and/or the term or end date of the membership of the user ground station 2 in the system 100.

The current status of each user ground station 2 may be indicated as being operational, being calibrated, under maintenance, security compromised, or offline. A user ground station may be regarded as available to receive encryption key deliveries if it is indicated as being available. A user ground station may be regarded as not available to receive key deliveries if it is indicated as being under maintenance, security compromised, or offline. Other possible current status indications may also be used.

In some examples the at least one ground control station 3 may also maintain records of new user ground stations 2 which it has been agreed will join the system 100, but which are not yet operational. The record for such a new user ground station 2 may indicate the date on which the new user ground station is to become operational.

In some examples the at least one ground control station 3 may also maintain records of ex-user ground stations 2 which have left the system 100. The record for such an ex-user ground station 2 may indicate the current status as being terminated. The maintenance of a record for such an ex-user ground station 2 may simplify reinstatement of the ex-user ground station 2 if it subsequently re-joins the system 100.

The records maintenance module 304 of the at least one ground control station 3 also maintains an encryption key management record for each user ground station 2. These encryption key management records of the user ground stations 2 are stored in the mass memory 303 of the at least one ground control station 3. Conveniently, the encryption key management records of the user ground stations 2 are stored in the mass memory 303 as a key management database 309. The key management database 309 stores information regarding the number of unused encryption keys stored in the encryption key buffer of each user ground station 2, and the key consumption rate at which encryption keys are used by each user ground station 2

In operation of the satellite quantum key distribution system 100, the records maintenance module 304 of the at least one ground control station 3 updates the encryption key management records of the user ground stations 2 based on the reports on missions carried out and/or attempted by each satellite 1 which are received by the at least one ground control station 3. The records maintenance module 304 may also update the encryption key management records of the user ground stations 2 based on reports from the user ground station on missions carried out and/or attempted.

In operation of the satellite quantum key distribution system 100, each of the user ground stations 2 may report the number of unused encryption keys stored in its associated encryption key buffer to the at least one ground control user station 3 through the communications module 305 of the at least one ground control user station 3. The records maintenance module 304 of the at least one ground control station 3 updates the encryption key management records of the user ground stations 2 based on these reports, to update the indicated number of unused encryption keys stored in the encryption key buffers of the different user ground stations 2. Further, the records maintenance module 304 may use these reports to determine the key consumption rate of each user ground station, and update the record for the user ground stations 2 accordingly. In the illustrated embodiment the user ground stations 2 send these reports periodically on a predetermined schedule. In some examples a user ground station 2 may additionally, or alternatively, send these reports when the number of unused encryption keys stored in its associated encryption key buffer reaches a predetermined trigger level and/or following the delivery of additional encryption keys from a satellite 1.

In some examples the information indicating which other user ground stations 2 are associated with each user ground station 2 may be stored in the key management database 309 instead of the ground stations records database 308.

In practice the encryption key management records of the different user ground stations 2 will change much more often than the other records of the user ground stations 2, so that it is convenient to have a separate user ground stations records database 308 and secured key management database 309. However, this is not essential, and in some examples this information may all be stored in a single database.

Figure 6:
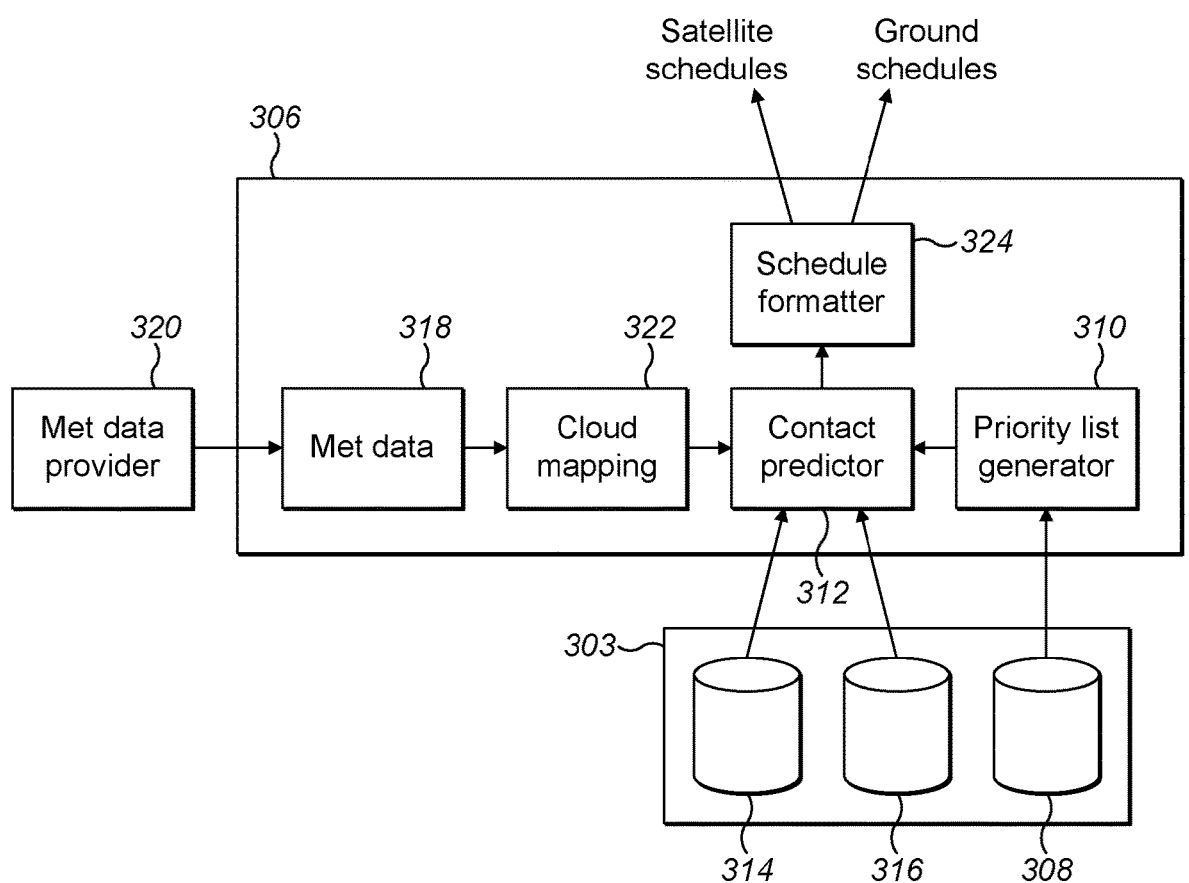
FIG. 6 is a schematic diagram of a scheduling module of the ground control station of FIG. 5.

FIG. 6 shows a schematic diagram of a scheduling module 306 of the at least one ground control station 3 of the satellite quantum key distribution system 100 according to the first embodiment.

The scheduling module 306 comprises a priority list generation module 310. Periodically, the priority list generation module 310 obtains data regarding the user ground stations 2 from the user ground stations records database 308 and uses these to produce a priority list of user ground stations 2 of the satellite quantum key distribution system 100, and stores this in the mass memory 303. The priority list is a list of user ground stations 2 that are regarded as being available to receive encryption key deliveries and require encryption keys to be delivered to them and the required target number of encryption keys to be delivered to each of these user ground stations 2. The scheduling module 306 can store the produced priority list in the mass memory 303 of the at least one ground control station 3.

When producing the priority list the priority list generation module 310 of the scheduling module 306 makes a determination that a user ground station 2 requires encryption keys to be delivered by comparing the number of encryption keys stored in the key buffer of the user ground station 2 to a threshold value for that user ground station 2. These threshold values may, for example, be part of the record for each user ground station 2. If the number of encryption keys stored in the key buffer of the user ground station 2 is less than the threshold the priority list generation module 310 makes a determination that the user ground station 2 requires encryption keys to be delivered, and determines the target number of encryption keys which are required to be delivered to the user ground station 2 as the number required to raise the number of unused encryption keys stored in the key buffer of the user ground station 2 to a predetermined desired value. The predetermined desired values may, for example, be part of the record for each user ground station 2. In some examples the threshold values may be based on the total size of the key buffer of the user ground station 2.

Further, for each of the user ground stations 2 determined to require encryption keys to be delivered, the priority list generation module 310 uses the indications in the record for the user ground station to identify the other user ground stations 2 which are associated with that user ground station 2. These associated user ground stations 2 must have encryption keys in common with the user ground station of interest in order to support cryptographic services between them. Accordingly, the identified associated ground user stations 2 are added to the priority list with the same target number of encryption keys which are required to be delivered.

In alternative examples the entry of user ground stations onto the priority list may be based on the number of encryption keys stored in the key buffer of the user ground station 2 and the key consumption rate at which encryption keys are used by the user ground station 2 to determine the period of time before the stored encryption keys are all used, and comparing this period of time to a threshold time. If the determined period of time is less than the threshold the priority list generation module 310 makes a determination that the user ground station 2 requires encryption keys to be delivered. The target number of keys to be delivered may be based on the determined period of time and the key consumption rate, with a higher target number being assigned to user ground stations 2 having a shorter determined period of time and to user ground stations 2 having a higher key consumption rate.

In another alternate example, some or all of the user ground stations 2 may monitor the number of encryption keys stored in their own key buffers and compare this to a threshold value, or use this to determine the period of time before the stored encryption keys are all used, and comparing this period of time to a threshold time, and when the compared value is below the respective threshold, request the delivery of encryption keys from the ground control station 3, and identify a target number of encryption keys to be delivered. The priority list generation module 310 can then respond to these requests by adding the user ground stations 2 sending the requests to the priority list. In some such alternate examples the requests from the user ground stations 2 may identify the other user ground stations 2 with which the requesting user ground stations 2 are associated, and so require encryption keys in common in order to support cryptographic services between them, and these associated ground user stations 2 are also added to the priority list with the same target number of encryption keys which are required to be delivered.

In operation of the satellite quantum key distribution system 100, the scheduling module 306 periodically generates a key delivery schedule for the satellite quantum key distribution system 100 as a whole. In the illustrated example a new schedule is calculated when, or shortly before, one of the satellites 1 in the constellation of satellites 1 passes over one of the ground control stations 3, and so can receive a new schedule. This may allow the schedule to be updated in a timely manner to take into account any changes, and particularly any changes in atmospheric and/or weather conditions, such as cloud cover. In other examples new schedules may be calculated at other times.

In the illustrated example the key delivery schedule extends for 180 minutes, three hours, into the future. This corresponds to two 90 minute orbits of each of the satellites 1. This key delivery schedule is then used to generate individual key delivery schedules which are sent to each of the satellites 1 and to each of the user ground stations 2 which are to receive encryption keys. Although the key delivery schedule extends for 180 minutes it is preferred to generate new schedules more often than this so that a new schedule can be sent to each satellite 1 on each orbit as it passes over a ground control station 3. In examples where there are a larger number of ground control stations 3 it may be preferred to send a new schedule to each satellite 1 each time the satellite passes over a ground control station 3. Sending new schedules more often may increase efficiency of the system 100 by allowing more optimal and timely updating to take into account changes, for example changes in weather effects such as cloud cover. It will be understood that when a satellite 1 or user ground station 2 receives a new schedule this is used to replace any overlapping existing schedule, even if the existing schedule has not yet been completed.

The generation of a schedule extending two satellite orbits ahead is not essential. In the illustrated example, each satellite 1 will pass over a ground control station 3 once per orbit. It may be preferred for the schedule provided to a satellite when it passes over a ground control station 3 should extend at least until the next occasion on which the satellite 1 will pass over a ground control station 3 to receive a new schedule, so that the satellite 1 is not left idle, reducing the efficiency of the system 100. The use of a schedule extending two satellite orbits ahead may be preferred in order to provide a safety margin in case a satellite 1 is unable to receive a new schedule when it passes over a ground control station 3. In general it may be preferred to update the satellites 1.

Figure 7:
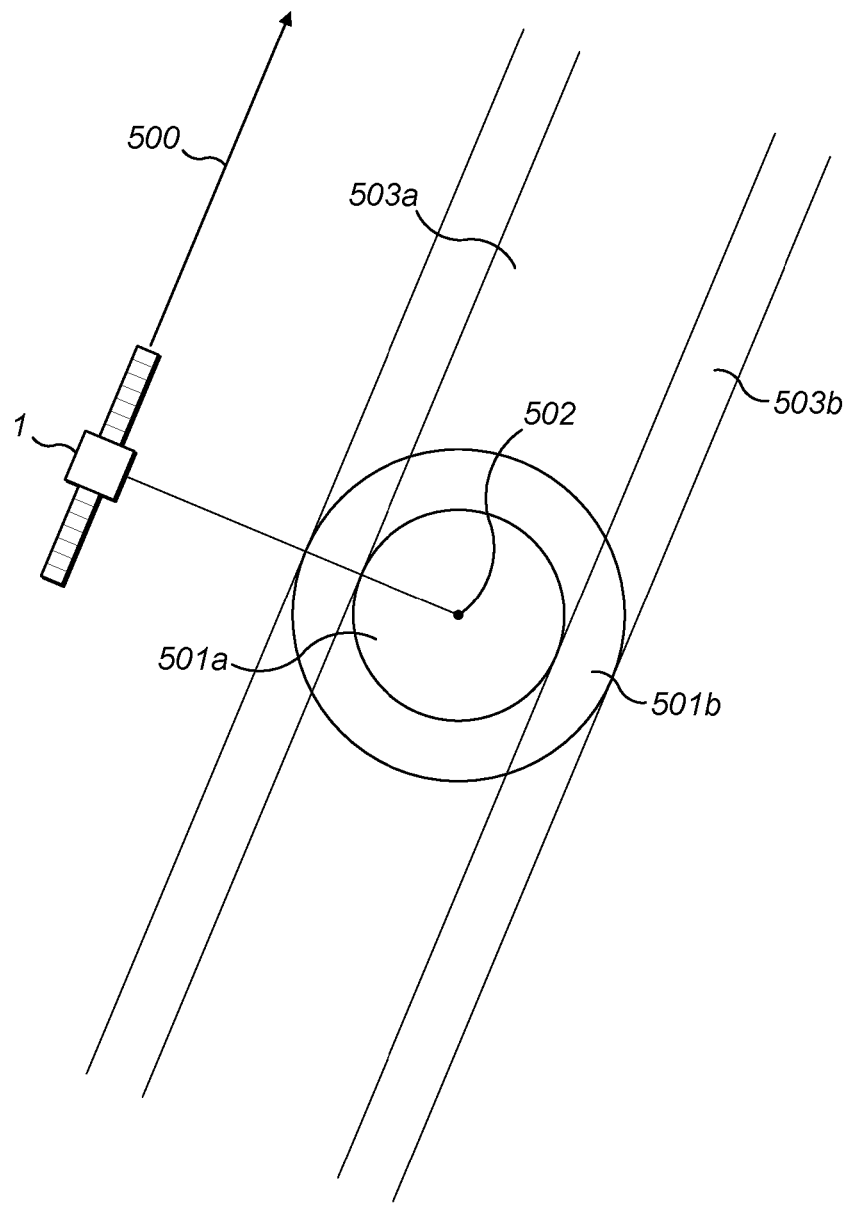
FIG. 7 is a schematic diagram of a satellite in the system of FIG. 1.

FIG. 7 shows a schematic diagram of a single satellite to illustrate some concepts of the key delivery schedule and its generation.

Figure 8:
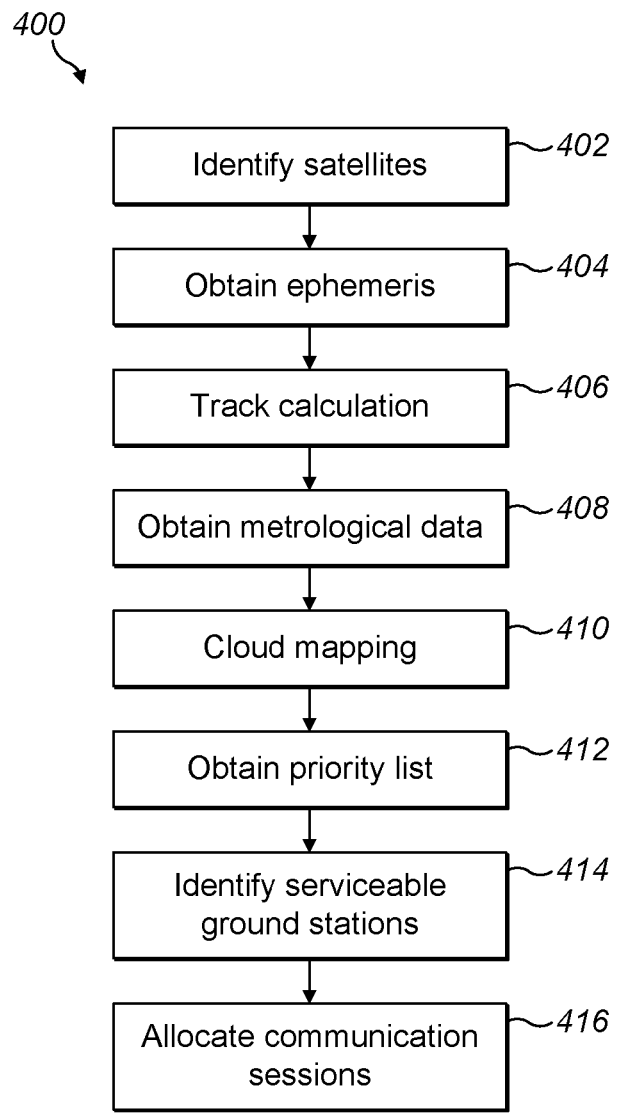
FIG. 8 is a flow diagram showing a schedule generation method useable by the scheduling module of FIG. 6.

To generate the key delivery schedule, the scheduling module 306 carries out a schedule generation method 400, which is shown in FIG. 8.

The scheduling module 306 begins the schedule generation method 400 by a contact predictor 312 of the scheduling module 306 obtaining information identifying the available satellites 1 of the system 100 from a deployed resource register 314 stored in the mass memory 303, in a first, identify satellites block 402. Next, the contact predictor 312 obtains ephemeris data for the identified available satellites 1 from a satellite ephemeris database 316 stored in the mass memory 303, in an obtain ephemeris block 404.

As shown in FIG. 7, a satellite 1 follows an orbital track 500. The satellite 1 has a first serviceable area 501a on the earths surface within which the satellite 1 can potentially deliver encryption keys to user ground stations 2 using the first QKD methodology described above. In the illustrated example this first serviceable area 501a is a circle having a radius of approximately 1000 km around a centre point 502 located vertically below the satellite 1. As the satellite 500 moves along the orbital track 500 the first serviceable area 501a of the satellite 1 moves in a corresponding manner and defines a first region on the earths surface within which user ground bases can potentially be provided with encryption keys by the satellite 1 using the first QKD methodology. This first region is the first serviceable strip 503a.

The satellite 1 also has a second serviceable area 501b on the earths surface within which the satellite 1 can potentially deliver encryption keys to user ground stations 2 using the second or third QKD methodologies described above. In the illustrated example this second serviceable area 501b is a circle having a radius of approximately 1700 km around a centre point 502 located vertically below the satellite 1. As the satellite 500 moves along the orbital track 500 the second serviceable area 501b of the satellite 1 moves in a corresponding manner and defines a second region on the earths surface within which user ground bases can potentially be provided with encryption keys by the satellite 1 using the second or third QKD methodologies. This second region is the second serviceable strip 503b.

It will be understood that the satellites 100 may be able to operate in additional QKD methodologies having different respective serviceable areas 501 and serviceable strips 503. These will all be determined by the contact predictor 312.

The contact predictor 312 then uses the obtained satellite ephemeris data to determine the orbital path of each of the available satellites 1 and the resulting serviceable areas 501 and serviceable strips 503 over time for the next 24 hours for each possible QKD methodology for each satellite 1 in a track calculation block 406. It will be understood that satellite orbits are relatively stable so that a prediction is highly reliable for at least 24 hours ahead. The use of a 24 hour period for the track calculation is not essential, and other periods may be used, it is only necessary that he track calculation period is at least as long as the key delivery schedule.

When determining the serviceable areas 502 and serviceable strips 503 over time the contact predictor 312 also uses the ephemeris data to determine when each of the available satellites 1 will have a suitable status to carry out encryption key supply, and identifies only parts of the earths surface from which the available satellites 1 have a suitable status as being part of a serviceable areas 502 and part of the serviceable strips 503. In the illustrated embodiment the suitable status is that the satellite 1 is in eclipse from the earths surface, that is, the satellite 1 is in the shadow of the sun cast by the earth. The satellite 1 being in eclipse will ensure that the laser beam transmitted by the satellite 1 has a high degree of contrast when received at a user ground station 2, allowing more efficient operation of the quantum optical communication link between the satellite 1 and a user ground station 2.

Then, a metrological data acquisition module 318 of the scheduling module 306 obtains metrological data from an external metrological data provider 320 in an obtain metrological data block 408. In the illustrated embodiments the obtained metrological data comprises meteorological predictions for the next 6 hours. The use of a 6 hour period for the track calculation is not essential, and other periods may be used, it is only necessary that he track calculation period is at least as long as the key delivery schedule. Currently, metrological predictions beyond 6 hours are not sufficiently reliable to be used, but this may change in the future.

A cloud mapping module 322 of the scheduling module 306 then uses the obtained metrological data to map out cloud cover to form a cloud cover prediction map for the coming 6 hours in a cloud mapping block 410. The cloud cover prediction map comprises information identifying both the location and height of cloud. The cloud cover prediction map may also include the expected opacity or 'thickness' of the cloud cover.

The contact predictor 312 then obtains the current stored priority list identifying user ground stations 2 which require a delivery of encryption keys from the priority list generator 310, or the mass memory 303, in an obtain priority list block 412.

The contact predictor 312 then compares the locations of the user ground stations 2 in the obtained priority list to the determined serviceable strips 503 and the cloud cover prediction map to determine the identity of user ground stations 2 which require a delivery of encryption keys, are located in a determined serviceable strip 503, and are not blocked from establishing a quantum optical communication link with a satellite 1 by cloud cover, and so can potentially receive a delivery of encryption keys from at least one of the available satellites 1 in the next two satellite orbital periods, corresponding to the 180 minutes or 3 hours of the schedule, and so be serviced by the available satellites 1, in an identify serviceable ground stations block 414. The identified user ground stations 2 are referred to as serviceable user ground stations 2 below.

In the identify serviceable ground stations block 410 the contact predictor 312 must compare the locations of user ground stations 2 in the obtained priority list requiring the delivery of encryption keys by particular QKD methodologies to appropriate determined serviceable strips 503 corresponding to those methodologies. Further, in the identify serviceable ground stations block 410 for ground stations requiring the delivery of encryption keys using the first QKD methodology identified above which requires quantum optical communications links from the satellite to two user ground stations simultaneously, or other methodologies requiring simultaneous quantum optical communications links to multiple user ground stations 2, contact predictor 312 must ensure that both of the associated user ground stations 2 using the first QKD methodology are located in the same determined serviceable strip 503 and are both not blocked by cloud.

In the identify serviceable ground stations block 410, the contact predictor 312 uses the ephemeris data together with the cloud cover prediction map, and the locations of the user ground station 2 in the priority list to determine whether or not the user ground stations 2 are blocked from establishing a quantum optical communication link with a satellite 1. This determination is made taking into account the three-dimensional geometry of the positions of the user ground stations 2, any clouds, any potential obstruction, and the orbital tracks 500 of the available satellites 1. It will be understood that depending on the heights of the clouds at different locations it may be possible to establish a quantum optical communication link between a satellite 1 and a user ground station 2 at some points on the orbital track 500 of that satellites 1, but not at others. In some examples the locations of the user ground stations 2 may be determined using a satellite navigation system, such as GPS. In some examples potential obstructions may be identified using three dimensional models.

The contact predictor 312 then compares the determined serviceable strips 503 of the satellites 1 for the next 180 minutes/3 hours of the new schedule period being calculated and the identified serviceable user ground stations 2 in a series of tasking periods, and decides for each tasking period which serviceable user ground station(s) 2 each of the satellites 1 carries out a communication session with to deliver a number of encryption keys.

Each tasking period corresponds to a length of time required by a satellite 1 to set up a communications session and deliver a batch of encryption keys to a user ground station 2. The tasking period is the sum of the time taken for a number of different actions by the satellite 1 and a user ground station 2. A first part of the tasking period is a target acquisition time, the time taken by the satellite 1 to bring a telescope, or other directional optical system, of the satellite 1 into an appropriate configuration to establish a quantum optical communications link between the satellite 1 and a user ground station 2. This target acquisition time may comprise one or both of altering an orientation of the satellite as a whole and slewing the telescope, or other directional optical system, relative to the body of the satellite 1, in order to bring the telescope, or other directional optical system, to bear on the user ground station 2. A second part of the tasking period is the time taken to establish a quantum optical communications link between the satellite 1 and a user ground station 2 after the telescope of the satellite has been brought into an appropriate configuration, such as handshaking, synchronisation, etc. A third part of the tasking period is the time taken for the encryption key delivery itself, and the length of this time will depend upon the number of encryption keys it is desired to deliver in each batch of encryption keys, and the time taken to deliver each encryption key. The time taken for encryption key delivery may also vary with the quality of the optical elements used by the user ground station 2 to establish the quantum optical communications link, and the atmospheric conditions prevailing at the time the link is established.

It will be understood that the time taken for each of the different parts of the tasking period may vary from case to case for each communication session between a satellite 1 and a user ground station 2. Accordingly, in order to determine the tasking period an estimate is made for the time each part of the tasking period is likely to take on average based upon the performance parameters of the satellites 1 and user ground stations 2 which are part of the system 100 under average, or most common, atmospheric conditions. The length of the tasking period will vary depending on the length of the selected time for encryption key delivery, and thus the number of encryption keys to be delivered in each communications session. The length of the selected time for encryption key delivery may be selected for each system 100 based on the characteristics of the available constellation of satellites and the number and requirements of the user ground stations to be serviced. In general, if a longer time is selected for encryption key delivery this will result in more efficient delivery of encryption keys, because the satellites 1 will be spending a greater proportion of their time actually delivering encryption keys. On the other hand, if a shorter time is selected for encryption key delivery this will result in a shorter tasking period, which may increase the flexibility of the system 100 and enable it to deliver encryption keys to a greater number of user ground stations 2, particularly where user ground stations 2 are close together.

In some examples it may be preferred to make the tasking period longer than the period determined as set out above in order to provide a safety margin.

In the illustrated example the tasking period is approximately 3 minutes, and the satellite 1 will be in eclipse for about a third of each orbit, so that there will be approximately 20 tasking periods available in which a satellite 1 can carry out a key delivery in the 180 minutes/3 hours of the new schedule being calculated, and approximately 10 tasking periods available in each 90 minute orbit of a satellite 1.

The series of tasking periods may be regarded as corresponding to dividing the length of each of the serviceable strips 503 into a series of adjacent tasking regions 504, where each tasking region 504 is a section of a respective serviceable strip 503 having a length which corresponds to the distance moved by a serviceable area 501 of a satellite 1 during a tasking period.

Figure 9:
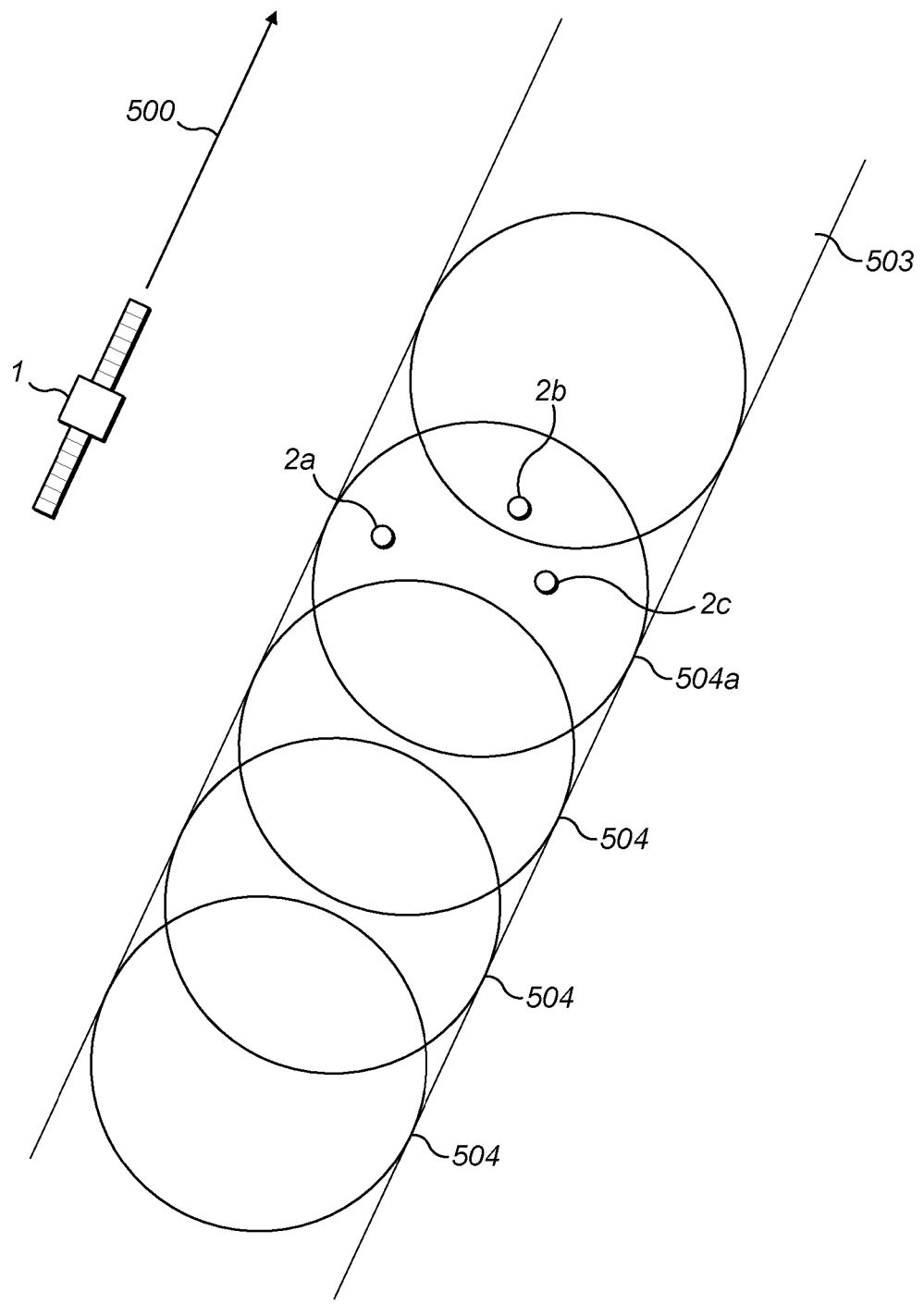
FIG. 9 is an explanatory diagram of operation of the system of FIG. 1

FIG. 9 shows a schematic diagram of a single serviceable strip 503 of a single satellite 1 divided into a series of approximately circular tasking regions 504.

The contact predictor 312 then decides for each of the tasking periods of the new key delivery schedule which of the serviceable user ground stations 2 each of the available satellites 1 will carry out a communication session with, and so deliver encryption keys to, in an allocate communication sessions block 416. It will be understood that because the satellites 1 only carry out communication sessions when they are in eclipse, in any particular tasking period one, some or all satellites 1 may not be carrying out a communication session. The decisions as to which user ground stations 2 are to be communicated with by each satellite 1 in each tasking period may be carried out in any order. In some examples it may be preferred to carry out this decision making in a time sequential manner so that the decision is made for each tasking period in chronological order to simplify keeping track of the changes in the status of the satellites 1 and the user ground stations 2 which will occur during the different encryption key deliveries. For example, all encryption key deliveries will increase the number of unused encryption keys stored in the key buffer of the participating user ground station 2, which may affect the priority given to that user ground station 2 in subsequent possible communications sessions, as will be explained below. Further, encryption key delivery using the second and third QKD methodologies described above will require encryption keys to be stored in a key data store of a satellite 1 until the encryption key deliveries to all associated user ground stations 2 have been completed, so that the encryption key deliveries must be planned so that the capacity of the key data store of each satellite 1 is not exceeded. Accordingly, encryption key deliveries which increase or decrease the number of encryption keys stored in the key data store of a satellite 1 may affect the priority given to different user ground stations 2 in subsequent possible communications sessions, as will be explained below.

As is explained above, the one or more ground control stations 3 can only communicate with each of the satellites 1 when that satellite 1 is over, or in other words, within a communication distance of, one of the one or more ground control stations 3. Accordingly, the contact predictor 312 identifies when each satellite 1 will next pass over one of the one or more ground control stations 3 and can be sent a new schedule, and only decides the activity of that satellite 1 in the new schedule for tasking periods after this time. There is no purpose in assigning communication tasks to a satellite in the schedule at times before the schedule can be sent to the satellite for execution.

For some satellites 1 in some tasking periods there may be only one serviceable user ground station 2 which the satellite 1 is able to carry out a communication session and deliver encryption keys. In these cases it is of course a simple decision that the satellite should carry out a communication session with, and deliver encryption keys to, this user ground station 2.

However, it is expected that for most satellites in most tasking periods there will be a plurality of possible serviceable user ground stations 2 with which the satellite could establish a communication session and deliver encryption keys using one or more QKD methodologies, so that the contact predictor 312 will need to make a decision which of the plurality of serviceable user ground stations 2 the satellite 1 is to carry out a communication session with, and deliver encryption keys to.

For example, in FIG. 9, during the tasking period when the illustrated satellite 1 is able to establish a communication session in the tasking region 504a there are three possible serviceable user ground stations 2a to 2c located in the tasking region 504a with which the satellite 1 could establish a communications session to deliver encryption keys. FIG. 9 shows only a single set of tasking regions 504 corresponding to a single QKD methodology. In practice there will generally be multiple sets tasking regions 504 corresponding to a different QKD methodologies associated with each satellite 1.

In making this decision the contact predictor 312 will take into account a number of different factors. In the illustrated example these different factors are be taken into account by assigning each factor a value, summing all of the values which apply to a particular user ground station 2 for a satellite 1 in a specific tasking period, comparing the resulting summed values for each of the plurality of user ground stations 2, and assigning the satellite 1 to carry out a communication session in that tasking period with the user ground station 2 having the highest summed value. The priority given to different factors may be changed by multiplying the value for each factor by a weighting value and changing the weighting values. This will allow the decisions made by the contact predictor 312 to be adjusted in response to changes in the system 100, or to fine tune the operation of the system 100.

It will be understood that depending upon the values and weights which are applied to the different factors in may be appropriate in some alternative examples to instead assign the satellite 1 to carry out a communication session in a tasking period with the user ground station 2 having the lowest summed value.

It is not essential that a weighted summing operation is used. In alternative examples any suitable known method of reaching a decision based on multiple factors may be used.

In an alternative example the contact predictor 312 may make the decision which of the serviceable user ground stations 2 the satellite 1 is to carry out a communication session with, and deliver encryption keys to, by defining an objective which is to be achieved across a number of user ground stations 2, which may be all user ground stations 2, by that satellite 1, and using an optimization algorithm to assign the satellite 1 to carry out communication session in a different tasking period with the user ground stations 2 to maximise the value or degree by which this objective is achieved. In some examples the objective to be optimized may be delivery of a maximum number of encryption keys by the satellite 1 to the number of user ground stations 2. In some examples the objective to be optimized may be to minimize the likelihood of any key buffer(s) becoming empty of encryption keys across the user ground stations 2. In some examples the degree of achievement of the objective may be assessed by assigning a relative weighting to each user ground station 2 and calculating a sum of the weighted degree of achievement of the objective at each of the user ground stations 2. In some examples the optimization algorithm may assign the satellites 1 to carry out communication sessions in different tasking periods with the user ground stations 2 to maximise the value or degree by which this objective is achieved by all of the satellites 1 of the constellation, The factors taken into account by the contact predictor 312 to decide for each of the tasking periods of the new key delivery schedule which of the serviceable user ground stations 2 each of the available satellites 1 will carry out a communication session with, and so deliver encryption keys to, in the allocate communication sessions block 416 may include the following factors for each possible serviceable user ground station 2 with which the satellite 1 could carry out a communication session in that tasking period:

The number of unused encryption keys remaining in the key buffer of the user ground station 2;

The expected time duration before the key buffer of the user ground station 2 is emptied and contains no unused encryption keys;

The number of undelivered encryption keys which were intended to be delivered in a previous key delivery schedule period;

The performance of the optical communication components of the user ground station 2;

The number of encryption keys stored in the key buffer of the satellite 1 and awaiting delivery;

Whether further opportunities to carry out a communication session with the user ground station 2 will occur later in the schedule period;

The photon budget or communication link time budget required to deliver encryption keys from the satellite 1 to the user ground station 2;

Expected metrological and atmospheric conditions for the user ground station 2;

Geometrical factors;

The satellite resource cost required to service the user ground station 2.

The number of keys awaiting delivery to each other user ground station 2 associated with the user ground station 2 to ensure that such associated user ground stations 2 are provided with encryption keys in common as quickly as possible, so that the associated user ground stations can support cryptographic services between them, and to avoid the encryption keys being stored on-board the satellite 1 for long periods.

Another factor which could optionally be taken into account is any agreed terms of service for the user ground station 2.

Looking at the possible factors in more detail:

A higher priority will be given to a user ground station 2 having a smaller number of unused encryption keys in its key buffer relative to the minimum allowable buffer level. This may be based on the absolute number of unused encryption keys in the key buffer, or the number relative to some target or threshold value, or the total size of the key buffer of the user ground station. Since the purpose of the system 100 is to deliver encryption keys to the user ground stations 2 it is desirable to keep the number of unused encryption keys stored at each user ground station high.

A higher priority will be given to a user ground station 2 having a shorter expected time duration before the key buffer of the user ground station 2 is emptied and contains no unused encryption keys. This expected time duration can be readily calculated from the number of unused encryption keys in the key buffer of the user ground station 2 and the key consumption rate of the user ground station 2. It will be understood that it is most important that no user ground station ever runs out of unused encryption keys.

Preferably, both the number of unused encryption keys remaining in the key buffer of the user ground station 2 and the expected time duration before the key buffer of the user ground station 2 is emptied are updated when a satellite 1 is assigned to carry out a communication session and deliver encryption keys to the user ground station, so that when considering further possible communication sessions later in the new schedule period the priority assigned to that user ground station 2 is based on the expected key buffer status of that user ground station 2 after the assigned communication session has been carried out.

A higher priority will be given to a user ground station 2 for which encryption keys were scheduled to be delivered in a previous key delivery schedule period, but were not delivered. A higher priority may be assigned when the number of scheduled but undelivered encryption keys is larger. It is desirable to ensure that such overdue undelivered encryption keys are delivered in order to maintain quality of service to the user ground stations.

In examples where the satellite 1 is able to operate at different communication speeds to match the capabilities of the user ground station 2, the performance of the optical communication components of the user ground station 2 may be taken into account by assigning a higher priority to user ground station 2 having optical communication components which will be able to support a higher rate of key delivery during a communication session with a satellite 1. This may enable more encryption keys to be delivered overall, improving efficiency of the system.

The number of encryption keys stored in the key buffer of the satellite 1 and awaiting delivery may be taken into account in a number of ways for user ground stations 2 using QKD methodologies which require encryption keys to be stored in a key data store of the satellite 1, such as the second and third QKD methodologies discussed above.

Where encryption keys are already stored in the key data store of the satellite 1 to be delivered to the user ground station 2, a higher priority may be assigned if there is a larger number of such encryption keys stored in the key data store of the satellite 1. In order to avoid the key data store of the satellite 1 being filled, which would seriously limit operation of the satellite 1, it is desirable to prevent too many keys being stored in the key data store of the satellite 1 for any specific user ground station 2.

Where a communication session with a user ground station 2 will require encryption keys to be stored in the key data store of the satellite 1 for subsequent delivery to one or more other user ground stations 2, a lower priority may be assigned if there is a larger number of encryption keys stored in the key data store of the satellite 1. In order to avoid the key data store of the satellite 1 being filled, which would seriously limit operation of the satellite 1, it is desirable to prevent too many keys being stored in the key data store of the satellite 1.

Where the ephemeris data and cloud cover map indicates that there will be further opportunities for a satellite 1 to carry out a communication session and deliver encryption keys to a user ground station 2 later in the new key delivery schedule period a lower priority may be assigned. It is less important to deliver encryption keys to a user ground station 2 when there will be further opportunities to do so.

The photon budget or communication link time budget required to deliver encryption keys from the satellite 1 to the user ground station 2 indicates the amount of time required to deliver an encryption key, or a number of encryption keys, using an optical communications link from a satellite 1 to the user ground station 2. In general, a less optically and geometrically favourable communications link will deliver encryption keys at a slower rate, for example as a result of reception problems and errors. A lower priority may be assigned where the photon budget or communication link time budget is expected to be high, so that the encryption key delivery rate is expected to be slower. This may reduce the number of such slower delivery communications sessions and enable more encryption keys to be delivered overall by improving efficiency of the system.

The photon budget or communication link time budget from the satellite 1 to the user ground station 2 may be affected by light pollution in the vicinity of the user ground station 2 interfering with the optical communications link between the satellite 1 and the user ground station 2. For a specific user ground station 2 the degree of light pollution may vary at different satellite 1 orbital position having different optical communications link geometries.

The photon budget or communication link time budget from the satellite 1 to the user ground station 2 may be affected by the relative positions of the satellite 1 and the user ground station 2. For example, a user ground station 2 near to the edge of a serviceable area of a satellite 1 may experience lower performance of the optical communications link between the satellite 1 and the user ground station 2 as a result of the longer path length of the optical communications link through the atmosphere and greater beam dispersion.

The expected metrological and/or atmospheric conditions in the vicinity of the user ground station 2 may also affect the communications between the satellite 1 and the user ground station 2. Different metrological and atmospheric conditions may affect the performance of the optical communications link between the satellite 1 and the user ground station 2. A lower priority may be assigned where the expected metrological and atmospheric conditions are such that the performance of the optical communications link between the satellite 1 and the user ground station 2 is reduced, so that the encryption key delivery rate is expected to be slower. This may reduce the number of such slower delivery communications sessions and enable more encryption keys to be delivered overall by improving efficiency of the system.

In some examples the expected metrological and atmospheric conditions may be treated as part of the conditions affecting the photon budget or communication link time budget from the satellite 1 to the user ground station 2, and may be taken into account as part of an overall photon budget or communication link time budget calculation.

Geometric factors may influence how long a communication session can be within a tasking period. For example, if a user ground station 2 is close to the edge of a serviceable area of a satellite 1 it may only be possible to sustain a communications session between the satellite and that user ground station for a part of the tasking period, reducing the number of encryption keys which can potentially be delivered. A lower priority may be assigned where geometric factors reduce the possible length of a communications session. This may reduce the number of such short communications sessions and enable more encryption keys to be delivered overall by improving efficiency of the system.

The satellite resource cost required to service the user ground station 2 is the amount of satellite resources expected to be required to provide the required number of encryption keys to the user ground station 2. This may for example be expressed as the amount of satellite communication sessions per unit time which will need to be assigned to the user ground station in order to provide the number of encryption keys required in that unit time, taking into account the proportion of assigned satellite communication sessions which may be expected to fail due to changeable weather conditions and the like. The satellite resource cost of a user ground station may be calculated by a suitable algorithm. A higher priority may be assigned to user ground stations 2 having a lower satellite resource cost.

Optionally, a higher priority may be assigned to user ground stations 2 which have been accorded a higher service priority in their agreed terms of service with the operator of the system 100.

When the contact predictor 312 has generated the new key delivery schedule the method 400 ends, and the new key delivery schedule is sent to a schedule formatter 324 of the scheduling module 306.

The schedule formatter 324 parses the new key delivery schedule and generates satellite contact schedules for each of the available satellites 1 and ground contact schedules for each ground user station 2 which is to receive an encryption key delivery during the new key delivery schedule period.

Each satellite schedule sets out the necessary actions required for a respective satellite to carry out its assigned communication sessions and encryption key downloads during the new key delivery schedule period. Each satellite schedule may, for example, set out the timing and direction of satellite pointing commands and optical telescope pointing commands to be carried out by the satellite 1, and details of what encryption key delivery operations are to be carried out during each communication session. In other examples where the satellites 1 operate more autonomously, each satellite schedule may simply indicate which user ground station 2 the satellite 1 is to communicate with in each tasking period of the new schedule.

The satellite schedules are stored in the mass memory 303 of the at least one ground control station 3 until they can be sent to the respective satellites 1 when the satellites next pass over the at least one ground control station 3. The satellites 1 then proceed to execute the received satellite schedules.

Each ground contact schedule sets out the time when a key distribution communication session is to be held with a respective user ground station 2 and pointing information indicating the direction in which the optical telescope of the user ground station 2 should be pointed in order to carry out this key distribution communication session.

The at least one ground control station 3 sends the ground contact schedules to their respective user ground stations 2. The ground contact schedules are sent using an encrypted communications channel in order to prevent the disclosure of information which could assist malevolent actors in attempting a cryptographic attack on a user ground station during a key delivery communications session.

As described above the contact predictor 312 generates a new schedule which assigns communications sessions to each satellite 1 starting from the next occasion when that satellite will pass over the one or more ground control stations and receive the new schedule. Preferably, the contact predictor 312 generates the new schedule using predicted figures for the numbers of stored keys at the various user ground stations 2 and satellites 1 which assume that each of the satellites 1 will successfully complete all communication sessions which they are intended to carry out under the current schedule up to the time when that satellite 1 will pass over the one or more ground control stations and receive the new schedule.

Optionally, a further factor which may be taken into account by the contact predictor 312 in the allocate communication sessions block 416 to decide for each of the tasking periods of the new key delivery schedule which of the serviceable user ground stations 2 each of the available satellites 1 will carry out a communication session with, and so deliver encryption keys to, is the amount of target acquisition time required by the satellite 1 to bring a telescope, or other directional optical system, of the satellite 1 from its configuration in the previous tasking period into an appropriate configuration to establish a quantum optical communications link between the satellite 1 and a user ground station 2.

If this option is taken, a higher priority will be given to a user ground station 2 having a shorter target acquisition time. This will allow the satellite 1 to spend more of the tasking period actually delivering encryption keys, increasing the overall efficiency of the system 100.

Optionally, where it is a high priority to deliver encryption keys to a user ground station 2, for example because the expected time duration before the key buffer of the user ground station 2 is emptied is short, but the photon budget or communication link time budget of the user ground station 2 is high, a satellite 1 may be instructed to spend a longer period than a tasking period establishing and operating a communications session with that user ground station 2 in order to ensure that the necessary encryption keys are delivered in an efficient manner. This longer period may, for example, be two consecutive tasking periods. This may improve overall system efficiency compared to conducting a series of communications sessions with the user ground station 2, each of which delivers only a small number of encryption keys as a result of the high photon budget or communication link time budget.

Figure 10:
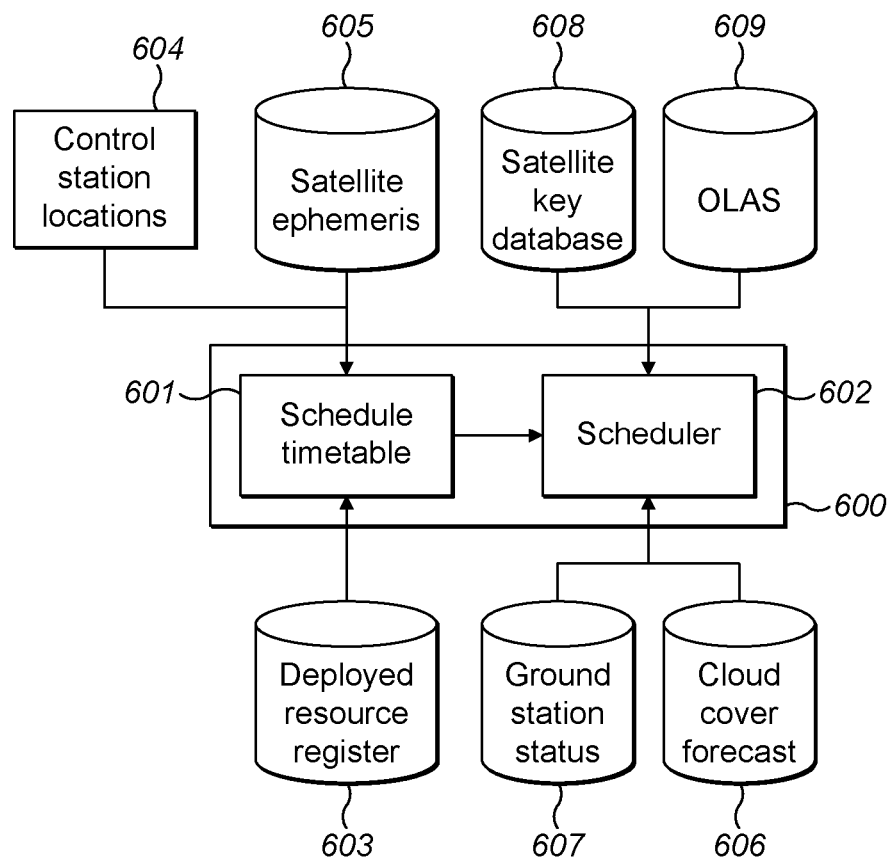
FIG. 10 is schematic diagram of an alternative scheduling module of the ground control station of FIG. 5 according to a second embodiment.

FIG. 10 shows a schematic diagram of an alternative scheduling module 600 of the at least one ground control station 3 of the satellite quantum key distribution system 100 according to a second embodiment. The scheduling module 600 according to the second embodiment may be used instead of the scheduling module 306 of the first embodiment described above.

The scheduling module 600 according to the second embodiment comprises a schedule timetable module 601 and a schedule generation module 602. The schedule timetable module 601 controls the operation of the schedule generation process and triggers the creation of individual schedules for the different satellites 1 and user ground stations 2 by the schedule generation module 602.

An overview of the operation of the mission scheduler 600 is that the schedule timetable module 601 periodically obtains information regarding available satellites 1 of the satellite quantum key distribution system 100 from a deployed resource register 603. The schedule timetable module 601 then uses the obtained information regarding available satellites, together with information regarding the location(s) of the one or more ground control stations 3 from a ground control station locations record 604, and ephemeris information of the satellites 1 from a satellite ephemeris record 605, to generate a list of times at which it will be possible to communicate a new schedule to one of the satellites 1 from one of the ground control stations 3. The deployed resource register 603 of the second embodiment corresponds to the deployed resource register 314 of the first embodiment, the satellite ephemeris record 605 of the second embodiment corresponds to the satellite ephemeris database of the first embodiment, and the ground control station locations record 604 of the second embodiment corresponds to a part of the user ground stations records database 308 of the first embodiment.

The deployed resource register 603 contains records of all available satellites 1 of the satellite quantum key distribution system 100, and is updated and maintained based upon launches or acquisitions of new satellites 1 into the system 100, any operational issues regarding satellites 1 of the system 100 which may impair or prevent their use temporarily, and the permanent removal of satellites 1 from the system 100, for example due to failure of satellite systems or deorbiting of a satellite. The deployed resource register 603 corresponds to the deployed resource register 314 of the first embodiment. The ground control station locations record 604 contains information regarding the locations of the one or more ground control stations 3 of the satellite quantum key distribution system 100. The satellite ephemeris record 605 contains ephemerides of the satellites 1 of the system 100. The satellite ephemeris record 605 corresponds to the satellite ephemeris database 316 of the first embodiment. Conveniently, the deployable resource register 603, ground control station locations record 604 and satellite ephemeris record 605 may be comprised in the mass data store 303 of the at least one ground control station 2, but this is not essential.

The schedule generation module 602 generates schedules driven by the list of times generated by the schedule timetable module 601 when a new schedule can be communicated to a satellite 1. To generate a schedule, the schedule generation module 602 generates near real-time predictions of cloud coverage along the orbital path of each of the satellites 1 from a cloud cover forecast data store 606. The cloud cover forecast data store 606 may be provided with meteorological data from any suitable source(s), for example from the NOAA Global Forecasting System (GFS) provided by the National Oceanic and Atmospheric Administration (NOAA) and/or from the European Centre for Medium-Range Weather Forecasts (ECMWF), or from other organizations. The schedule generation module 602 combines the meteorological data from the cloud cover forecast data store 606 with the records of available satellites 1 from the deployed resource register 603 and the ephemerides from the satellite ephemeris record 605 to predict the visibility of user ground stations 2 for quantum communication with the available satellites 1 over a future period. In the illustrated second embodiment this future period is the next 24 hours. However, different periods may be used in other examples.

The schedule generation module 602 then generates a schedule for each of the operational satellites 1 of the system 100, based on a number of factors, as follows:

The encryption key volume remaining to be delivered to each user ground station 2 from previous schedules.

The encryption key volume remaining to be delivered by each of the satellites 1.

The meteorological conditions forecast at each user ground station 2 location, and particularly the forecast cloud cover.

The unused encryption key volume remaining in the key buffer of each user ground station 2.

The predicted duration remaining before emptying the unused secret key volume available in the key buffer of each user ground station 2.

The predicted opportunities for the schedule to be communicated to a satellite 1.

Other key distribution sessions (that is, communication sessions between a satellite 1 and a user ground station 2) which may block a planned communication session.

Confirmation of the availability of a target user ground station 2.

The status of each satellite 1 in its orbital cycle (e.g. whether the satellite 1 is in eclipse).

The communications performances/capability of a target user ground station 2.

Another factor which could optionally be taken into account is any agreed terms of service or service level agreement (SLA) for a user ground station 2.

In other examples some of the factors identified above may be omitted, and/or additional factors may be considered.

The encryption key volume may, for example, be measured based on the number of encryption keys, or the amount of data comprising the encryption keys, as convenient in any specific implementation.

Some of the factors listed above may be determined based on information obtained from a user ground stations status database 607 containing information regarding identities and locations of user ground stations 2, a satellite key database 608 containing information regarding the volume of allocated encryption keys for delivery to each user ground station 2 that is stored on the satellite 1, and an operating level agreement (OLA) database 609 containing information regarding volumes of encryption keys required to be available at each user ground station 2. The user ground stations status database 607 of the second embodiment corresponds to a part of the user ground stations records database 308 of the first embodiment.

Figure 11:
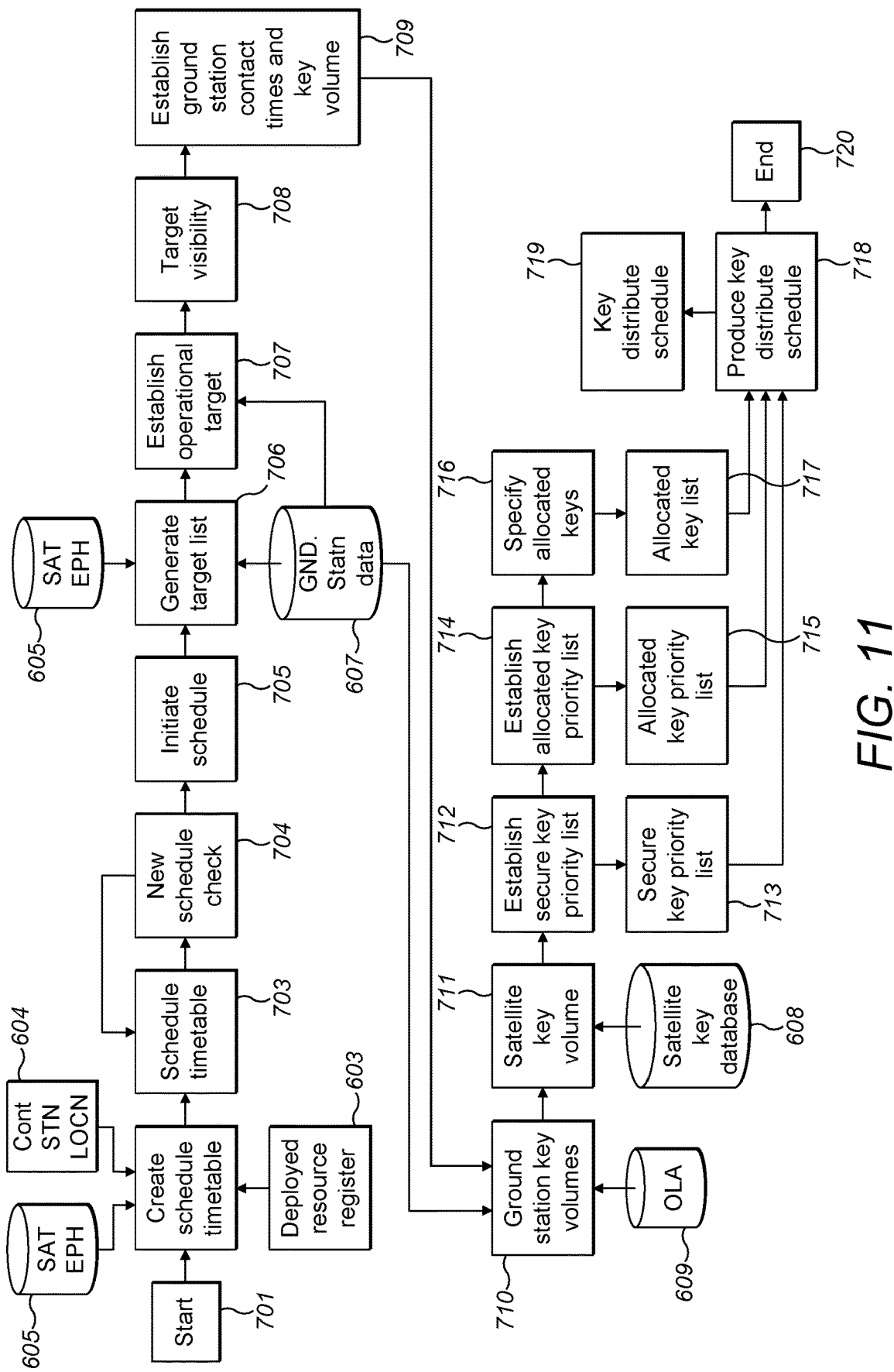
FIG. 11 is a flow diagram showing a schedule generation method useable by the scheduling module of FIG. 10.

FIG. 11 shows a flow chart of a more detailed example of a schedule generation method 700 which may be carried out by the scheduling module 600 according to the second embodiment.

The schedule generation method 700 begins with a start block 701. Then, in a create schedule timetable block 702, the schedule timetable module 601 interrogates the deployed resource register 603 to determine which satellites 1 are available for encryption key delivery communication sessions over the next 24 hours. Further, the schedule timetable module 601 obtains ephemerides of the satellites 1 from the satellite ephemeris record 605 and the locations of the one or more ground control stations 3 from a ground control station locations record 604.

Then, the schedule timetable module 601 determines a number of things for each of the operational satellites 1 identified in the deployed resource register 603. The schedule timetable module 601 determines the times at which the satellite 1 will be within communications range of a ground control station 3. The next one of these determined times is the time by which a new schedule is required to be completed for the satellite 1, so that it can be sent to the satellite 1. The schedule timetable module 601 further determines the eclipse periods for the satellite 1 for the next 24 hours during which the satellite 1 will be in eclipse. The schedule timetable module 601 further uses the eclipse periods to determine the start and finish times for any potential quantum key delivery communication sessions by the satellite 1 (as is discussed above, the satellite 1 should be in eclipse during communication sessions with user ground stations 2). The schedule timetable module 601 further determines from the orbital path of the satellite 1 described by the ephemeris of the satellite the coverage of the satellite 1 over the next 24 hours, the coverage being the parts of the surface of the earth within which a user ground station 2 and the satellite 1 will be visible to one another so that, in principle the satellite 1 will be able to set up a communication link with the user ground station 2. Finally, the schedule timetable module 601 determines a 'trigger time' at which a new schedule generation activity must start for the satellite 1 in order for a new schedule to be available to be uploaded or communicated to the satellite 1 at the next of the determined times when the satellite 1 will be within communications range of a ground control station 3.

Then, the schedule timetable module 603 consolidates the determinations for all of the operational satellites 1 to produce a schedule timetable 703. The schedule timetable 703 a series of entries, each entry comprising, a scheduled 'trigger time', the identity of the satellite 1, the start time of each available communication session by that satellite 1, the finish time of each available communication session by that satellite 1, the duration of the schedule, and the schedule up-link time when the schedule is to be communicated to the satellite 1 from one of the one or more ground control stations 3. The schedule timetable comprises the entries for all of the satellites 1. Conveniently, the entries may be placed in chronological order to simplify searching for a next entry, but this is not essential.

In the illustrated second embodiment the create schedule timetable block 702 is carried out daily, that is, every 24 hours. This is not essential, and a different timing may be used in other examples.

In a new schedule check block 704, the schedule generation module 602 periodically interrogates the current schedule timetable 703 to determine whether a new schedule needs to be generated. To do this, the schedule generation module 602 checks whether the next trigger time of an entry in the schedule timetable 703 is before the next periodic interrogation will take place, that is, whether the next trigger time is within the period of the periodic interrogation. In the illustrated second embodiment the periodic interrogation is made every five minutes, and the schedule generation module 602 checks whether the next trigger time in the schedule timetable 703 is within the next five minutes. If the next trigger time is not before the next periodic interrogation will take place, no action is taken. Alternatively, if the next trigger time is before the next periodic interrogation will take place, the schedule generation module 602 proceeds to the initiate schedule block 705. The use of a period of five minutes is not essential, and in other examples a different time period may be used.

In the initiate schedule block 705, the schedule generation module 602 begins generating a schedule for the satellite 1 identified in the entry in the schedule timetable 703 which was identified as being within the period of the periodic interrogation in the new schedule check block 704.

Then, the schedule generation module 602 generates a user ground station target list for the satellite 1 in a generate target list block 706. In the generate target list block 706 the schedule generation module 602 obtains satellite ephemeris information for the satellite 1 from the satellite ephemeris record 605, and information regarding identities and locations of user ground stations 2 from the user ground stations status database 607. The schedule generation module 602 uses the obtained satellite ephemeris information and information regarding identities and locations of user ground stations 2, together with the schedule duration information from the entry in the schedule timetable 703, to determine the identities and locations of any user ground stations 2 which will be able to be carry out a communication session with the satellite 1 during the available communication session(s) when the satellite 1 is in eclipse (this may be referred to as the user ground stations 2 being visible to the satellite). In some examples this may be carried out by comparing the determined coverage of the satellite 1 to the locations of the user ground stations. The schedule generation module 602 then generates a list of these determined visible user ground stations 2.

Then, in an establish operation targets block 707, the schedule generation module 602 determines which of the determined visible user ground stations 2 have a suitable status for a communications session. In the establish operations targets block 707 the schedule generation module 602 obtains user ground station status information from the user ground stations status database 607 for each of the visible user ground stations 2 listed on the list of determined visible user ground stations 2 and determines which of the listed visible user ground stations 2 have a suitable status to carry out an encryption key delivery communication session with the satellite 1. The schedule generation module 602 then generates an operational target list of these determined visible user ground stations 2 having a suitable status for a communications session. Examples of possible user ground station status are discussed above regarding the first embodiment. In some examples of the second embodiment a user ground station 2 may be regarded as having a suitable status for a communication session if it has a status of operational or being calibrated. Other possible status indications may also be used.

Then, in a target visibility block 708, the schedule generation module 602 determines which of the determined visible user ground stations 2 having a suitable status for a communications session are likely to be cloud free, or partially cloud free to a sufficient degree for a communications session during the overpass of the satellite 1 over the user ground station 1. In the target visibility block 708, for each user ground station 2 on the operational target list, the schedule generation module 602 calculates a stop and start time of an overpass of the satellite 1 over that user ground station 2. These stop and start times may be determined geometrically from the location of the user ground station and the ephemeris of the satellite. In one example, the start time may be determined as the time when the ascending (from the point of view of the user ground station) satellite 1 first reaches 20 degrees elevation as seen from the user ground station 2, and the stop time may be determined when the descending (from the point of view of the user ground station) satellite 1 again reaches 20 degrees elevation as seen from the user ground station 2. In other examples different criteria, for example different angles, may be used to determine the start time and stop time.

The schedule generation module 602 obtains meteorological data from the cloud cover forecast database 606. Then, if the time of the midpoint of the communication session by the satellite 1, that is, the time midway between the start time of the communication session and the finish time of the communication session, determined from the satellite eclipse period of the satellite 1, is more than 15 minutes from the time of the latest meteorological data analysis/forecast provided to the cloud cover forecast database 606, the schedule generation module 602 extrapolates the cloud coverage data from the obtained meteorological data to provide predicted cloud coverage for the midpoint of the communication session by the satellite 1. Alternatively, if the time of the midpoint of the communication session by the satellite 1 is less than 15 minutes from the time of the latest meteorological data analysis/forecast, the schedule generation module 602 extracts the current cloud coverage data from the meteorological data. In other examples, a different time period than 15 minutes may be used.

In either case, for each user ground station 2 on the operational target list, the schedule generation module 602 extracts the cloud coverage data for the satellite coverage area centred on the user ground station 2 within which area the satellite 1 can carry out an encryption key delivery communication session with the user ground station 2. This area may correspond to the serviceable area 501, 501a or 501b discussed above with reference to the first embodiment. The use of a 15 minute period is not essential and different periods of time may be used in other examples. Further, the use of extrapolation of the cloud coverage data is optional, and may be omitted in some examples. The schedule generation module 602 then determines whether cloud coverage is expected in the line of sight between the satellite 1 and the user ground station 2 for every 60 second period of the overpass of the satellite 1 for the user ground station 2 between the determined start time and stop time. Each 60 second period of the overpass for each user ground station is flagged (or otherwise identified) as being either cloud free if cloud coverage in the line of sight is not expected, or cloudy if cloud coverage in the line of sight is expected.

The schedule generation module 602 then uses the flagged time periods for each user ground station 2 to produce a target ground station visibility list providing the time of each cloud free flag for each user ground station 2 on the operational target list.

Then, in an extract contact time and key volume block 709, the schedule generation module 602 determines the overall contact times for each overpass of the satellite 1 over each user ground station 2 on the operational target list, and estimates the encryption key volumes which can be delivered during those contact times. In the extract contact time and key volume block 709, for each user ground station 2 on the target ground station visibility list the schedule generation module 602 determines the parameters of the communications link which can potentially be established between the satellite 1 and the user ground station 2 during each 60 second period which is flagged as cloud free. The parameters of the potential communications link may be determined taking into account, for example, the geometry of the overpass, the technical specifications of the satellite 1 and the user ground station 2. Other relevant factors may also be taken into account.

The schedule generation module 602 then calculates, based on the determined parameters, the anticipated encryption key volume which can be transmitted between the satellite 1 and the user ground station 2 in each 60 second cloud free period. Further, the schedule generation module 602 calculates the total anticipated encryption key volume which can be transmitted between the satellite 1 and the user ground station 2 during the overpass as the sum of the anticipated encryption key volumes. Accordingly, the estimated encryption key volume which can be transmitted to the user ground station 2 in each 60 seconds (1 minute) of the overpass, and during each overpass is determined.

Then, in an establish key volumes block 710, the schedule generation module 602 establishes the volume of secure encryption keys and allocated secure encryption keys in each user ground station 2 that is in the target ground station visibility list. The secure encryption keys are encryption keys provided to the user ground station 2 which have not been matched or paired with encryption keys at other user ground stations 2. An allocated secure encryption key is a secure encryption key which has been matched, grouped or paired with secure encryption keys at one or more other user ground stations 2.

In some examples, after error detection and error correction has been carried out, the secure encryption key is derived from the sifted key. The secure encryption key consists of the actual key bits and a unique key handle for referencing the secure encryption key. The secure encryption key is stored in the key buffer, together with various meta data (e.g. involved user ground stations), where it remains until it is either further processed or revoked. The secure encryption key at a particular user ground station 2, once it has been matched with secure encryption keys at one or more partner user ground stations 2 through a "pairing", "grouping" or "sharing" process becomes an allocated secure encryption key. Note that this process does not require further use of the Quantum Channel from the satellite but can be performed via a Classical Channel (either via the Satellite Optical Link or other).

For each user ground station 2 on the target ground station visibility list the schedule generation module 602 obtains from the user ground stations status database 607 the available volume of secure encryption keys and the available volume of allocated secure encryption keys stored in the key buffer of that user ground station 2, and obtains from the OLA database 609 a volume of allocated secure encryption keys required to be available at that user ground station 2. The OLA database 609 of the second embodiment corresponds to a part of the user ground stations records database 308 of the first embodiment.

The volume of allocated secure encryption keys required to be available at a user ground station 2 may be agreed between the operator of the system 100 and the user or users associated with the user ground station 2. The volume of allocated secure encryption keys required may be determined based on a range of factors, as is discussed above in relation to the first embodiment.

Then, for the user ground stations 2 that are in the target ground station visibility list, the schedule generation module 602 calculates the difference between the available volume of allocated secure encryption keys stored in the key buffer of each user ground station 2 and the volume of allocated secure encryption keys required to be available at that user ground station 2. The schedule generation module 602 then calculates priorities for secure encryption key delivery and converting secure encryption keys into allocated secure encryption keys by pairing or grouping with secure encryption keys at other user ground stations (for example by the OTP/XOR process described with reference to the first embodiment) for each of the user ground stations 2 in the target ground station visibility list based on the calculated difference. In some examples, where the available volume of encryption keys is less than the required volume of encryption keys a higher priority is assigned when the difference between the two volumes (which may be regarded as the shortfall) is larger.

In some examples, the established priority for secure encryption key delivery and converting secure encryption keys for each of the user ground stations 2 may alternatively, or additionally, be based on a predicted time before each user ground station 2 runs out of allocated encryption keys. In some examples, the established priority for secure encryption key delivery and converting secure encryption keys for each of the user ground stations 2 may alternatively, or additionally, be based on an anticipated length of time before a further satellite communication session with the each user ground station 2 will be possible. In some examples, other priority criteria discussed with reference to the first embodiment may be used.

In some examples the priority for secure encryption key delivery may additionally, or alternatively, be based on the volume of secure encryption keys available at the user ground station 2 compared to an agreed required volume of secure encryption keys.

Then, the schedule generation module 602 produces a secure priority list of priority user ground stations 2 for delivery of secure encryption keys and an allocated priority list of user ground stations 2 for converting allocated encryption keys for the user ground stations 2 that are in the target ground station visibility list based on the respective established priorities for secure encryption key delivery and secure encryption key conversion. The secure priority list and allocated priority list may rank the user ground stations 2 in order of established priority.

In some examples, some user ground stations may not use some of the possible QKD methodologies, and as a result, may have no volume or required volume for one of secure encryption keys or allocated encryption keys. Such user ground stations 2 may be assigned zero priority in the corresponding one of the secure priority list or the allocated priority list, or omitted from the corresponding one of the secure priority list or the allocated priority list, as convenient in any specific implementation.

Then, in an establish satellite key volumes block 711, the schedule generation module 602 determines the volume of encryption keys available for pairing or grouping with secure encryption keys at each user ground station 2 (to convert secure encryption keys at the respective user ground station to allocated secure encryption keys) in the allocated priority list that are stored on the satellite 1. For each user ground station 2 on the allocated priority list, the schedule generation module 602 interrogates the satellite key database 608 to determine what volume of encryption keys available for pairing or grouping with secure encryption keys at that user ground station 2 are stored on the satellite 1, and adds, or associates, the determined volume of encryption keys to the entry for that user ground station 2 in the allocated priority list.

Then, in an establish secure key delivery priority list block 712, the schedule generation module 602 generates a time ordered and prioritized list of user ground stations 2 desiring distribution of secure encryption keys from the satellite 1 during the duration of the schedule. The schedule generation module 602 uses the priorities of the user ground stations 2 listed in the secure priority list and the respective estimated encryption key volume which can be transmitted to each user ground station 2 during each overpass which was determined in the extract contact time and key volume block 709 to determine the user ground stations 2 on the secure priority list for which QKD delivery of secure encryption keys should take place during the duration of the schedule, and the optimal start and finish times of each of the communication sessions between these ground stations 2 and the satellite 1 to carry out the QKD delivery. The schedule generation module 602 uses the determined user ground stations 2 and the corresponding start and finish times to produce a secure key priority list 713 comprising a chronological list of optimum QKD secure encryption key communication sessions between user ground stations 2 and the satellite 1 for the duration of the schedule.

Then, in an establish allocated key delivery priority list block 714, the schedule generation module 602 generates a time ordered and prioritized list of user ground stations 2 desiring distribution of encryption keys from the satellite 1 for pairing or grouping with secure encryption keys at the user ground station 2 during the duration of the schedule. The schedule generation module 602 uses the priorities of the user ground stations 2 listed in the allocated priority list and the respective volume of encryption keys available for each user ground station 2 that are stored on the satellite 1 which was determined in the establish satellite key volumes block 711 to determine the user ground stations 2 on the allocated priority list for which delivery of encryption keys should take place during the duration of the schedule, and the optimal start and finish times of each of the communication sessions between these ground stations 2 and the satellite 1 to carry out the delivery. The schedule generation module 602 uses the determined user ground stations 2 and the corresponding start and finish times to produce an allocated key priority list 715 comprising a chronological list of optimum allocated encryption key communication sessions between user ground stations 2 and the satellite 1 for the duration of the schedule.

Then, in a specify allocated keys block 716, the schedule generation module 602 generates a list of which encryption keys stored on the satellite 1 are to be distributed to each of the user ground stations 2 on the allocated key priority list 715. For each user ground station 2 on the allocated key priority list 715, the schedule generation module 602 generates a list of encryption keys that need to be distributed to that user ground station 2 during the relevant satellite overpass. The encryption keys may, for example, be identified in the list by their key handles. The schedule generation module 602 then produces an allocated key list 717 which lists each user ground station 2 on the allocated key priority list 715 together with the encryption keys that need to be distributed to that user ground station 2.

Further, the schedule generation module 602 may generate a list of encryption keys stored on the satellite which will have been distributed to all necessary user ground stations 2 during this schedule, that is, allocated encryption keys which will complete their final key pairing or grouping, and mark them for deletion by the satellite 1 after completion of the current generated schedule.

Then, in a produce key distribution schedule block 718, the schedule generation module 602 generates a key distribution schedule 719. The schedule generation module 602 combines and synthesizes the secure key priority list 713 and the allocated key priority list 715 to generate an optimised schedule. The schedule generation module 602 then uses the optimised schedule to produce a key distribution schedule 719 which identifies the timing of the communication sessions to be carried out between the satellite 1 and the different user ground stations 2. This key distribution schedule 719 can then be formatted as necessary and sent to the satellite 1 and the user ground stations 2 identified in the key distribution schedule 719 to be actioned. In some examples this formatting may be carried out by a schedule formatter or schedule formatting module corresponding to the schedule formatter 324 of the first embodiment.

The generation of the current schedule then ends in an end block 720. It will be understood that the new schedule check block 704 will continue periodically checking the next trigger time for generating a new schedule, and triggering the initiate schedule block 705 to generate new schedules as necessary.

In some examples the allocated key list 717 may be combined with the key distribution schedule 719 to inform the satellite 1 which allocated encryption keys stored in the satellite 1 are to be sent. In other examples the allocated key list 717 may be sent separately to the satellite 1.

In the second embodiment separate priority lists are produced for secure encryption keys and allocated encryption keys. In some examples, depending upon the QKD key delivery methodologies supported by the system 100, only one type of encryption key may be used, either secure encryption keys or allocated encryption keys. In such examples the blocks relating to the unused encryption key type may be omitted. Further, in such examples, the key priority list 713 or 715 of the supported encryption key type may be used as the optimised schedule.

In the second embodiment the schedule generation module 602 may comprise a number of sub-modules, each of these sub-modules being a module arranged to carry out one or more blocks of the method of FIG. 11.

It will be clear from the above description that the disclosed embodiments are closely related. Accordingly, features described with reference to ne embodiment can generally be combined with the other embodiment.

In some examples of the second embodiment described above, the ground control station locations record 604, the user ground stations status database 607, and the OLA database 609 may be combined into a single database. This single database may correspond to the user ground stations records database 308 of the first embodiment.

In the first embodiment described above the contact predictor 312 determines the serviceable strips 503 for the satellites 1 only for times when the respective satellites 1 are in eclipse, while the second embodiment described above only considers user ground stations 2 able to carry out a communication session with the satellite 1 while the satellite 1 is in eclipse. In some examples where it is also possible to establish communications sessions and carry out delivery of encryption keys when the satellites 1 are not in eclipse the serviceable strips or user ground stations 2 may also be determined when the satellites 1 are not in eclipse. In some examples only some satellites 1 and/or some user ground stations 2 may be able to do this, and communications sessions outside eclipse will be established only for capable satellite 1 and ground user station 2 pairings. In some examples of the first embodiment a different tasking period may be used for eclipse and non-eclipse communications sessions, to reflect the different characteristics of eclipse and non-eclipse communications.

In the first embodiment described above the contact predictor 312 divides the new schedule period into tasking periods. It is expected that this will simplify the task of producing the schedule. In other examples this may not be done and the schedule may be determined on a more granular timescale.

In the embodiments described above the key consumption rates of the ground user stations 2 is calculated based on reports of key usage from the ground user stations 2. In other examples estimated key consumption rates may be used. These estimated key consumption rates may, for example, be provided when a ground user station is set up.

In the embodiments described above the satellite quantum key distribution system 100 comprises a constellation of satellites 1. This constellation may comprise any number of satellites. Specifically, the constellation may comprise a single satellite 1.

In the embodiments described above the satellite quantum key distribution system 100 comprises a constellation of satellites 1. In some examples the constellation of satellites may include satellites having different capabilities, for example different optical communications capabilities and/or a capability to support different QKD methodologies.

In the embodiments described above satellite ephemerides are used. In other examples other descriptors of satellite orbital paths may be used.

In the embodiments described above the use of flags is referred to. In other examples alternative markers may be used.

In the embodiments described above the satellite quantum key distribution system 100 comprises a number of user ground stations 2. This may be a large number of user ground stations 2, for example 10,000 or more.

In some of the the embodiments described above the number of encryption keys is referred to. In other examples the data volume of encryption keys may be monitored and responded to instead of the number. The number or volume of encryption keys may be used interchangeably, and both may be referred to as the amount of encryption keys.

In the embodiments described above the at least one ground control station is located at a high latitude. In other examples the at least one ground control station may be located elsewhere, but this will generally reduce the efficiency of the system by requiring a greater number of ground control stations and/or increasing the length of time between successive passes of each satellite over the at least one ground control station.

In the embodiments described above the satellite quantum key distribution system comprises one or more satellites are located in Low Earth Orbit (LEO). In some alternative arrangements, the satellite quantum key distribution system may comprise one or more satellites placed in LEO while at least one other satellite is placed in Medium Earth Orbit (MEO) or in High Earth Orbit (HEO).

In the embodiments described above the satellite quantum key distribution system comprises one or more satellites are located in inclined polar orbits. In some alternative arrangements, one, some, or all of the satellites may be located in different orbits. In some alternative arrangements one, some, or all of the satellites may be in GEO, MEO or non-polar LEO orbits.

In the embodiments described above the system is a satellite quantum key distribution system. In other examples other cryptographic items could be distributed/delivered in addition to, or as an alternative to, encryption keys. Examples of such other cryptographic items include cryptographic tokens, cryptographic coins, or value transfers.

In the embodiments described above the at least one ground control station comprises a separate communications terminal and communications module. In some alternative examples these may be combined.

In the embodiments described above a classical (non-quantum) communication channel or link is provided between a satellite and a user ground station. In the embodiments described above this classical (non-quantum) communication channel or link may be provided by an optical communications channel or link between the satellite and the user ground station. In other examples the classical (non-quantum) communication channel or link may be provided by other forms of communications channel or link, for example by a radio communications channel or link. In some examples a classical (non-quantum) communication channel or link may be provided between a satellite and a user ground station by using one or more other user ground stations as relays. In such examples messages may be passed between user ground stations using any communication links, for example an optical fiber link, a telecommunications network, or the Internet, this list is not intended to be exhaustive.

The embodiments described above are fully automatic. In some examples a user or operator of the system may manually instruct some steps of the method to be carried out.

In the described embodiments of the invention parts of the system may be implemented as a form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Although illustrated as a single system, it is to be understood that a computing device may be a distributed system. Thus, for instance, several devices may be in communication by way of a network connection and may collectively perform tasks described as being performed by the computing device. Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of preferred embodiments is given by way of example only and that various modifications may be made by those skilled in the art.

What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A method of scheduling encryption key delivery communication sessions in a satellite quantum key distribution system comprising a constellation of one or more satellites and a plurality of user ground stations, the method comprising:
    producing a list of user ground stations requiring encryption keys;
    for each satellite of the constellation of satellites, determining a region of the earth's surface within which the satellite can carry out encryption key delivery communication sessions to user ground stations using a quantum optical communications link during a scheduling period;
    obtaining a cloud cover map;
    comparing the locations of the listed user ground stations, the determined regions of the earth's surface for the constellation of satellites, and the cloud cover map, to identify listed user ground stations to which encryption key delivery can be carried out by the constellation of satellites during the scheduling period; and
    determining which of the identified user ground stations each satellite of the constellation of satellites will carry out encryption key delivery communication sessions with at different times in the scheduling period based upon one or more of:
    an amount of unused encryption keys at each identified user ground station; and
    an expected time duration before each identified user ground station runs out of encryption keys.

2. The method as claimed in claim 1, wherein the determining which of the identified user ground stations each satellite of the constellation of satellites will carry out encryption key delivery communication sessions with at different times in the scheduling period is further based on an amount of encryption keys which were intended to be delivered to each identified user ground station in a previous scheduling period and were not delivered.

3. The method as claimed in claim 1, wherein, when the encryption key delivery sessions require encryption keys to be stored in a satellite, the determining which of the identified user ground stations each satellite of the constellation of satellites will carry out encryption key delivery communication sessions with at different times in the scheduling period is further based on an amount of encryption keys stored on each satellite of the constellation of satellites.

4. The method as claimed in claim 1, wherein the determining which of the identified user ground stations each satellite of the constellation of satellites will carry out encryption key delivery communication sessions with at different times in the scheduling period is further based on the rate of encryption key delivery which can be supported by optical communication components of the user ground station.

5. The method as claimed in claim 1, wherein the determining which of the identified user ground stations each satellite of the constellation of satellites will carry out encryption key delivery communication sessions with at different times in the scheduling period is further based on a photon budget or communication link time budget required to deliver encryption keys from the satellite to the user ground station.

6. The method as claimed in claim 5, wherein the photon budget or communication link time budget required to deliver encryption keys from the satellite to the user ground station is based on one or more of: geometrical factors of the relative positions of the user ground station and the satellite; atmospheric conditions; meteorological conditions; light pollution.

7. The method as claimed in claim 1, wherein the determining which of the identified user ground stations each satellite of the constellation of satellites will carry out encryption key delivery communication sessions with at different times in the scheduling period is further based on expected metrological and atmospheric conditions for the user ground station.

8. The method as claimed in claim 1, wherein the determining which of the identified user ground stations each satellite of the constellation of satellites will carry out encryption key delivery communication sessions with at different times in the scheduling period is further based on a possible length of an encryption key delivery communication session being limited by geometrical factors of the relative positions of the user ground station and the satellite.

9. The method as claimed in claim 1, wherein the encryption key delivery communication sessions are carried out by a methodology comprising:
forming quantum optical communication links from a satellite of the constellation to two user ground stations to send respective photons of entangled pairs to each of the user ground stations;
detecting the quantum information of the respective photons at the two user ground stations; and
conducting an encryption key agreement process between the two user ground stations using the detected quantum information to determine encryption keys.

10. The method as claimed in claim 1, wherein the encryption key delivery communication sessions are carried out by a methodology comprising:
generating a first string of random numbers on a satellite of the constellation;
using the first string of random numbers to form a first quantum optical communication link from the satellite to a first user ground station;
conducting an encryption key agreement process between the satellite and the first user ground station using the first string of random numbers to determine a first encryption key;
storing the first encryption key on the satellite;
and subsequently:
generating a second string of random numbers on the satellite;
using the second string of random numbers to form a second quantum optical communication link from the satellite to a second user ground station associated with the first user ground station;
conducting an encryption key agreement process between the satellite and the second user ground station using the second string of random numbers to determine a second encryption key;
sending one-time-pad "OTP" data of an OTP operation of the first encryption key and the second encryption key from the satellite to the second user ground station;
using the second encryption key and the OTP data to derive the first encryption key at the second ground station.

11. The method as claims in claim 10, wherein the methodology further comprises subsequently:
generating a further string of random numbers on the satellite;
using the further string of random numbers to form a further quantum optical communication link from the satellite to a further user ground station associated with the first user ground station and the second user ground station;
conducting an encryption key agreement process between the satellite and the further user ground station using the further string of random numbers to determine a further encryption key;
sending OTP data of the first encryption key and the further encryption key from the satellite to the further user ground station;
using the further encryption key and the OTP data to derive the first encryption key at the further ground station.

12. The method as claimed in claim 1, wherein determining which of the identified user ground stations each satellite of the constellation of satellites will carry out encryption key delivery communication sessions with at different times in the scheduling period is further based on a number of encryption keys delivered to one or more user ground stations associated with each user ground station.

13. The method as claimed in claim 1, wherein the encryption key delivery communication sessions are carried out by a methodology comprising:
generating a first string of random numbers on a satellite of the constellation;
using the first string of random numbers to form a first quantum optical communication link from the satellite to a first user ground station;
conducting an encryption key agreement process between the satellite and the first user ground station using the first string of random numbers to determine a first encryption key;
the first user ground station sending one-time-pad "OTP" data of an OTP operation of the first encryption key and a user encryption key to the satellite;
using the first encryption key and the OTP data to derive the user encryption key at the satellite;
storing the user encryption key on the satellite;
and subsequently:
forming a second quantum optical communication link from the satellite to a second user ground station associated with the first user ground station;
generating a second string of random numbers on the satellite;
using the second string of random numbers to form a second quantum optical communication link from the satellite to a second user ground station;
conducting an encryption key agreement process between the satellite and the second user ground station using the second string of random numbers to determine a second encryption key;
sending OTP data of the user encryption key and the second encryption key from the satellite to the second user ground station;
using the second encryption key and the OTP data to derive the user encryption key at the second ground station.

14. The method as claimed in claim 13, wherein the methodology further comprises subsequently:
generating a further string of random numbers on the satellite;
using the further string of random numbers to form a further quantum optical communication link from the satellite to a further user ground station associated with the first user ground station and the second user ground station;
conducting an encryption key agreement process between the satellite and the further user ground station using the further string of random numbers to determine a further encryption key;
sending OTP data of the user encryption key and the further encryption key from the satellite to the further user ground station;
using the further encryption key and the OTP data to derive the user encryption key at the further ground station.

15. The method as claimed in claim 1, wherein satellites of the constellation are able to use multiple methodologies to carry out the encryption key delivery communication sessions.

16. The method as claimed in claim 1, wherein the determining a region of the earth's surface within which the satellite can carry out encryption key delivery communication sessions to user ground stations is carried out only for regions where the satellite will be in eclipse.

17. The method as claimed in claim 1, wherein the producing a list of user ground stations requiring encryption keys comprises placing a user ground station on the list if the amount of encryption keys stored at the user ground station is below a threshold value.

18. A non-transitory computer-readable storage medium comprising code or computer instructions stored thereon, which when executed by a processor, causes the processor to perform the computer-implemented method according to claim 1.

19. An apparatus arranged to schedule encryption key delivery communication sessions in a satellite quantum key distribution system comprising a constellation of one or more satellites and a plurality of user ground stations, the apparatus comprising a processor, a memory, and a communication interface, the processor connected to the memory and the communication interface, wherein the apparatus is configured to:
produce a list of user ground stations requiring encryption keys;
for each satellite of the constellation of satellites:
determine a region of the earth's surface within which the satellite can carry out encryption key delivery communication sessions to user ground stations using a quantum optical communications link during a scheduling period;
obtain a cloud cover map;
compare the locations of the listed user ground stations, the determined regions of the earth's surface for the constellation of satellites, and the cloud cover map, to identify listed user ground stations to which encryption key delivery can be carried out by the constellation of satellites during the scheduling period; and
determine which of the identified user ground stations each satellite of the constellation of satellites will carry out encryption key delivery communication sessions with at different times in the scheduling period based upon one or more of:
an amount of unused encryption keys at each identified user ground station; and
an expected time duration before each identified user ground station runs out of encryption keys.

* * * * *